US011564150B2

(12) United States Patent
Cherian et al.

(10) Patent No.: US 11,564,150 B2
(45) Date of Patent: Jan. 24, 2023

(54) FACILITATING FAST PASSIVE DISCOVERY

(71) Applicant: QUALCOMM Incorporated, San Diego, CA (US)

(72) Inventors: George Cherian, San Diego, CA (US); Alfred Asterjadhi, San Diego, CA (US); Abhishek Pramod Patil, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 205 days.

(21) Appl. No.: 16/590,033

(22) Filed: Oct. 1, 2019

(65) Prior Publication Data

US 2020/0112910 A1    Apr. 9, 2020

Related U.S. Application Data

(60) Provisional application No. 62/742,769, filed on Oct. 8, 2018.

(51) Int. Cl.
| *H04W 48/10* | (2009.01) |
| *H04W 72/04* | (2009.01) |
| *H04W 84/12* | (2009.01) |
| *H04W 48/16* | (2009.01) |

(52) U.S. Cl.
CPC ....... *H04W 48/10* (2013.01); *H04W 72/0446* (2013.01); *H04W 48/16* (2013.01); *H04W 84/12* (2013.01)

(58) Field of Classification Search
CPC . H04W 48/10; H04W 48/16; H04W 72/0446; H04W 74/006; H04W 74/04; H04W 84/12
See application file for complete search history.

(56) References Cited

U.S. PATENT DOCUMENTS

| 2013/0177002 A1* | 7/2013 | Sun ..................... H04W 48/12 370/338 |
| 2016/0165524 A1* | 6/2016 | Kim ..................... H04W 52/02 370/338 |
| 2016/0262090 A1* | 9/2016 | Marin .................. H04W 48/16 |
| 2020/0092881 A1* | 3/2020 | Nezou ............... H04W 72/1257 |
| 2020/0221292 A1* | 7/2020 | Li ......................... H04W 76/11 |

\* cited by examiner

*Primary Examiner* — Kevin C. Harper
*Assistant Examiner* — Derrick V Rose
(74) *Attorney, Agent, or Firm* — Holland & Hart LLP/Qualcomm

(57) ABSTRACT

This disclosure provides systems, methods and apparatuses for advertising discovery information of an AP in one or more downlink (DL) transmissions. In some implementations, the AP may allocate a dedicated resource unit (RU) for advertising discovery information of the AP to stations not associated with the AP, and may allocate one or more additional RUs for DL transmissions to one or more stations associated with the AP. The AP may transmit a multi-user (MU) packet containing discovery information intended for the unassociated stations and containing non-discovery-related information intended for the one or more associated stations. The discovery information may be transmitted on the dedicated RU, and the non-discovery-related information may be transmitted on the one or more additional RUs.

33 Claims, 13 Drawing Sheets

FACILITATING FAST PASSIVE DISCOVERY

CROSS-REFERENCE TO RELATED APPLICATIONS

This Patent Application claims priority to U.S. Provisional Patent Application No. 62/742,769 entitled "FACILITATING FAST PASSIVE DISCOVERY" filed on Oct. 8, 2018, which is assigned to the assignee hereof. The disclosures of all prior Applications are considered part of and are incorporated by reference in this Patent Application.

TECHNICAL FIELD

This disclosure relates generally to wireless networks, and specifically to allocating resource units in wireless networks to facilitate fast passive discovery of a wireless access point.

DESCRIPTION OF THE RELATED TECHNOLOGY

A wireless local area network (WLAN) may be formed by one or more access points (APs) that provide a shared wireless medium for use by a number of client devices. Each AP may correspond to a Basic Service Set (BSS), and may periodically broadcast beacon frames to enable compatible wireless devices within wireless range of the AP to establish and maintain a communication link with the WLAN. A plurality of APs may be connected together to form an extended Basic Service Set (ESS).

An AP may create and operate multiple BSSs at the same time, and may assign a number of wireless devices to each of the BSSs. Each of the multiple BSSs may operate independently of each other, and may also operate on different frequency bands. Thus, when a wireless device seeks to join a wireless network, the wireless device may choose between multiple BSSs that operate on different frequency bands (such as the 2.4 GHz frequency band, the 5 GHz frequency band, and unlicensed portions of the 6 GHz frequency band). Although the wireless device may use active scanning operations to discover nearby APs or BSSs with which to associate, active scanning operations may reduce medium utilization and may consume time and power, particularly when scanning multiple channels in multiple frequency bands.

SUMMARY

The systems, methods and devices of this disclosure each have several innovative aspects, no single one of which is solely responsible for the desirable attributes disclosed herein.

One innovative aspect of the subject matter described in this disclosure can be implemented in a method for wireless communication. The method may be performed by an access point (AP), and may include allocating a dedicated resource unit (RU) for advertising discovery information of the AP to stations not associated with the AP, allocating one or more additional RUs for downlink (DL) transmissions to one or more stations associated with the AP, transmitting a multi-user (MU) packet including a discovery frame carried on the dedicated RU and including one or more non-discovery-related frames carried on the one or more additional RUs, receiving a response from at least one unassociated station based on the discovery information contained in the MU packet, and performing an association operation with the at least one unassociated station based on the response. The discovery frame may include discovery information intended for the unassociated stations, and the one or more non-discovery-related frames may include non-discovery-related information intended for the one or more associated stations. In some implementations, the discovery frame may be a fast initial link setup (FILS) discovery frame, a probe response frame, or a broadcast frame. Each of the one or more non-discovery-related frames may be a data frame, a control frame, or a management frame. The dedicated RU may be located on a primary 20 MHz channel of the AP or on a preferred scanning channel (PSC) of the AP.

In some implementations, the MU packet may include a preamble containing a first duplicate and one or more additional duplicates. The first duplicate may be transmitted on the dedicated RU and may include a station association identification (STAID) value identifying the unassociated stations. The one or more additional duplicates may be transmitted on the one or more additional RUs, and each duplicate of the one or more additional duplicates may include a STAID value identifying at least one station of the one or more associated stations.

In some implementations, the discovery information may include one or more of a unique identifier of the AP, a traffic indication map (TIM) element, a target wait time (TWT) element, an opportunistic power save (OPS) element, a modulation and coding scheme (MCS), an operating channel, an operating class, a basic service set (BSS) bandwidth, a transmit power limit, or a security parameter. In some other implementations, the discovery information may also include one or more of a request for the unassociated stations to use on-channel tunneling (OCT), an indication of whether the AP is part of a multiple basic service set identifier (BSSID) set, an indication of whether the AP is a transmitted BSSID or a non-transmitted BSSID, an indication of whether the AP is a member of an extended basic service set (ESS) in which all member APs operating in the same portion of a 6 GHz frequency band have a co-located AP operating in a 2.4 GHz frequency band or a 5 GHz frequency band, or an indication of whether the AP is a member of an ESS in which all member APs operating in the same band periodically transmit unsolicited probe response frames.

In addition, or in the alternative, the discovery information may include a value, embedded in a signaling field of the preamble of the MU packet or in a field of a frame carrying the discovery information, indicating whether active scanning operations are permitted on a wireless channel associated with the AP. In some implementations, the discovery information may also include one or more of instructions for the at least one unassociated station to maintain its transmit power below a value, to refrain from initiating active scanning operations on non-preferred scanning channels of the AP, or to refrain from initiating active scanning operations on a preferred scanning channel of the AP for a predetermined duration.

Another innovative aspect of the subject matter described in this disclosure can be implemented in a wireless communication device. In some implementations, the wireless communication device may be an access point (AP) that includes at least one modem, at least one processor communicatively coupled with the at least one modem, and at least one memory communicatively coupled with the at least one processor. The memory stores processor-readable code that, when executed by the at least one processor in conjunction with the at least one modem, causes the AP to perform operations including allocating a dedicated resource unit (RU) for advertising discovery information of the AP to stations not associated with the AP, allocating one or more additional RUs for downlink (DL) transmissions to one or more stations associated with the AP, transmitting a multi-user (MU) packet including a discovery frame carried on the dedicated RU and including one or more non-discovery-related frames carried on the one or more additional RUs, receiving a response from at least one unassociated station based on the discovery information contained in the MU packet, and performing an association operation with the at least one unassociated station based on the response. The discovery frame may include discovery information intended for the unassociated stations, and the one or more non-discovery-related frames may include non-discovery-related information intended for the one or more associated stations. In some implementations, the discovery frame may be a fast initial link setup (FILS) discovery frame, a probe response frame, or a broadcast frame. Each of the one or more non-discovery-related frames may be a data frame, a control frame, or a management frame. The dedicated RU may be located on a primary 20 MHz channel of the AP or on a preferred scanning channel (PSC) of the AP.

In some implementations, the MU packet may include a preamble containing a first duplicate and one or more additional duplicates. The first duplicate may be transmitted on the dedicated RU and may include a station association identification (STAID) value identifying the unassociated stations. The one or more additional duplicates may be transmitted on the one or more additional RUs, and each duplicate of the one or more additional duplicates may include a STAID value identifying at least one station of the one or more associated stations.

In some implementations, the discovery information may include one or more of a unique identifier of the AP, a traffic indication map (TIM) element, a target wait time (TWT) element, an opportunistic power save (OPS) element, a modulation and coding scheme (MCS), an operating channel, an operating class, a basic service set (BSS) bandwidth, a transmit power limit, or a security parameter. In some other implementations, the discovery information may also include one or more of a request for the unassociated stations to use on-channel tunneling (OCT), an indication of whether the AP is part of a multiple basic service set identifier (BSSID) set, an indication of whether the AP is a transmitted BSSID or a non-transmitted BSSID, an indication of whether the AP is a member of an extended basic service set (ESS) in which all member APs operating in the same portion of a 6 GHz frequency band have a co-located AP operating in a 2.4 GHz frequency band or a 5 GHz frequency band, or an indication of whether the AP is a member of an ESS in which all member APs operating in the same band periodically transmit unsolicited probe response frames.

In addition, or in the alternative, the discovery information may include a value, embedded in a signaling field of the preamble of the MU packet or in a field of a frame carrying the discovery information, indicating whether active scanning operations are permitted on a wireless channel associated with the AP. In some implementations, the discovery information may also include one or more of instructions for the at least one unassociated station to maintain its transmit power below a value, to refrain from initiating active scanning operations on non-preferred scanning channels of the AP, or to refrain from initiating active scanning operations on a preferred scanning channel of the AP for a predetermined duration.

Another innovative aspect of the subject matter described in this disclosure can be implemented in a method for wireless communication. The method may be performed by a station not associated with an access point (AP), and may include receiving, from the AP, a multi-user (MU) packet including a discovery frame carried on a dedicated RU and including one or more non-discovery-related frames carried on one or more additional RUs, transmitting a response to the AP based on discovery information contained in the MU packet, and associating with the AP based at least in part on the response or the received discovery information. The discovery frame may include discovery information intended for the unassociated stations, and the one or more non-discovery-related frames may include non-discovery-related information intended for the one or more associated stations. In some implementations, the discovery frame may be a fast initial link setup (FILS) discovery frame, a probe response frame, or a broadcast frame. Each of the one or more non-discovery-related frames may be a data frame, a control frame, or a management frame. The dedicated RU may be located on a primary 20 MHz channel of the AP or on a preferred scanning channel (PSC) of the AP.

In some implementations, the MU packet may include a preamble containing a first duplicate and one or more additional duplicates. The first duplicate may be transmitted on the dedicated RU and may include a station association identification (STAID) value identifying the unassociated stations. The one or more additional duplicates may be transmitted on the one or more additional RUs, and each duplicate of the one or more additional duplicates may include a STAID value identifying at least one station of the one or more associated stations.

In some implementations, the discovery information may include one or more of a unique identifier of the AP, a traffic indication map (TIM) element, a target wait time (TWT) element, an opportunistic power save (OPS) element, a modulation and coding scheme (MCS), an operating channel, an operating class, a basic service set (BSS) bandwidth, a transmit power limit, or a security parameter. In some other implementations, the discovery information may also include one or more of a request for the unassociated stations to use on-channel tunneling (OCT), an indication of whether the AP is part of a multiple basic service set identifier (BSSID) set, an indication of whether the AP is a transmitted BSSID or a non-transmitted BSSID, an indication of whether the AP is a member of an extended basic service set (ESS) in which all member APs operating in the same portion of a 6 GHz frequency band have a co-located AP operating in a 2.4 GHz frequency band or a 5 GHz frequency band, or an indication of whether the AP is a member of an ESS in which all member APs operating in the same band periodically transmit unsolicited probe response frames.

In addition, or in the alternative, the discovery information may include a value, embedded in a signaling field of the preamble of the MU packet or in a field of a frame carrying the discovery information, indicating whether active scanning operations are permitted on a wireless channel associated with the AP. In some implementations, the discovery information may also include one or more of instructions for the at least one unassociated station to maintain its transmit power below a value, to refrain from initiating active scanning operations on non-preferred scanning channels of the AP, or to refrain from initiating active scanning operations on a preferred scanning channel of the AP for a predetermined duration.

Another innovative aspect of the subject matter described in this disclosure can be implemented in a wireless communication device. In some implementations, the wireless communication device may include at least one modem, at least one processor communicatively coupled with the at least one modem, and at least one memory communicatively coupled with the at least one processor. The memory stores processor-readable code that, when executed by the at least one processor in conjunction with the at least one modem, causes the wireless communication device to perform operations including receiving, from the AP, a multi-user (MU) packet including a discovery frame carried on a dedicated RU and including one or more non-discovery-related frames carried on one or more additional RUs, transmitting a response to the AP based on discovery information contained in the MU packet, and associating with the AP based at least in part on the response or the received discovery information. The discovery frame may include discovery information intended for the unassociated stations, and the one or more non-discovery-related frames may include non-discovery-related information intended for the one or more associated stations. In some implementations, the discovery frame may be a fast initial link setup (FILS) discovery frame, a probe response frame, or a broadcast frame. Each of the one or more non-discovery-related frames may be a data frame, a control frame, or a management frame. The dedicated RU may be located on a primary 20 MHz channel of the AP or on a preferred scanning channel (PSC) of the AP.

In some implementations, the MU packet may include a preamble containing a first duplicate and one or more additional duplicates. The first duplicate may be transmitted on the dedicated RU and may include a station association identification (STAID) value identifying the unassociated stations. The one or more additional duplicates may be transmitted on the one or more additional RUs, and each duplicate of the one or more additional duplicates may include a STAID value identifying at least one station of the one or more associated stations.

In some implementations, the discovery information may include one or more of a unique identifier of the AP, a traffic indication map (TIM) element, a target wait time (TWT) element, an opportunistic power save (OPS) element, a modulation and coding scheme (MCS), an operating channel, an operating class, a basic service set (BSS) bandwidth, a transmit power limit, or a security parameter. In some other implementations, the discovery information may also include one or more of a request for the unassociated stations to use on-channel tunneling (OCT), an indication of whether the AP is part of a multiple basic service set identifier (BSSID) set, an indication of whether the AP is a transmitted BSSID or a non-transmitted BSSID, an indication of whether the AP is a member of an extended basic service set (ESS) in which all member APs operating in the same portion of a 6 GHz frequency band have a co-located AP operating in a 2.4 GHz frequency band or a 5 GHz frequency band, or an indication of whether the AP is a member of an ESS in which all member APs operating in the same band periodically transmit unsolicited probe response frames.

In addition, or in the alternative, the discovery information may include a value, embedded in a signaling field of the preamble of the MU packet or in a field of a frame carrying the discovery information, indicating whether active scanning operations are permitted on a wireless channel associated with the AP. In some implementations, the discovery information may also include one or more instructions for the at least one unassociated station to maintain its transmit power below a value, to refrain from initiating active scanning operations on non-preferred scanning channels of the AP, or to refrain from initiating active scanning operations on a preferred scanning channel of the AP for a predetermined duration.

BRIEF DESCRIPTION OF THE DRAWINGS

Like reference numerals refer to corresponding parts throughout the drawing figures.

DETAILED DESCRIPTION

Figure 1:
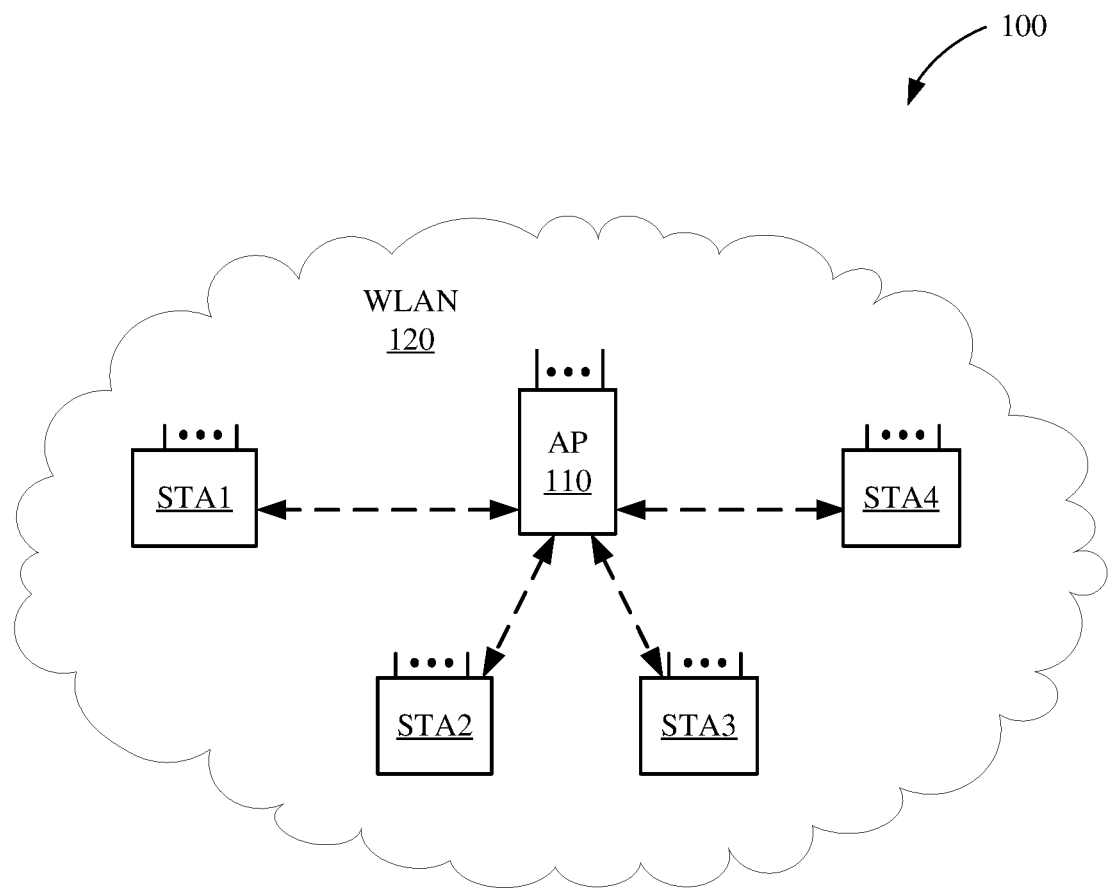
FIG. 1 shows a block diagram of a wireless system within which aspects of the present disclosure may be implemented.

The following description is directed to certain implementations for the purposes of describing the innovative aspects of this disclosure. However, a person having ordinary skill in the art will readily recognize that the teachings herein can be applied in a multitude of different ways. The described implementations may be implemented in any device, system or network that is capable of transmitting and receiving RF signals according to any of the IEEE 16.11 standards, or any of the IEEE 802.11 standards, the Bluetooth® standard, code division multiple access (CDMA), frequency division multiple access (FDMA), time division multiple access (TDMA), Global System for Mobile communications (GSM), GSM/General Packet Radio Service (GPRS), Enhanced Data GSM Environment (EDGE), Terrestrial Trunked Radio (TETRA), Wideband-CDMA (W-CDMA), Evolution Data Optimized (EV-DO), 1xEV-DO, EV-DO Rev A, EV-DO Rev B, High Speed Packet Access (HSPA), High Speed Downlink Packet Access (HSDPA), High Speed Uplink Packet Access (HSUPA), Evolved High Speed Packet Access (HSPA+), Long Term Evolution (LTE), AMPS, or other known signals that are used to communicate within a wireless, cellular or internet of things (IOT) network, such as a system utilizing 3G, 4G or 5G, or further implementations thereof, technology.

A wireless station (STA) may periodically scan its surroundings to find the most suitable access point (AP) with which to associate. Connected scans (or "roaming" scans) may refer to scanning operations performed by a STA while the STA is connected to an associated AP (such as to find a more suitable AP to roam to). Disconnected scans may refer to scanning operations performed by a STA that is not yet connected to any AP (such as to find a suitable AP to associate with). Because scanning operations may consume a significant amount of power and duration of time, it is desirable to perform passive scanning operations more efficiently.

The IEEE 802.11 standards define both passive and active scanning operations. In passive scanning, the STA may scan individual channels for beacon frames that are periodically transmitted by nearby APs. Each beacon frame typically includes the AP's Service Set Identification (SSID), supported data rates, synchronization information, and so on. When the STA receives a beacon frame, the STA may use information contained in the beacon frame to select with which AP to associate. In active scanning, the STA actively attempts to discover nearby APs by broadcasting probe request frames (such as rather than waiting to receive beacon frames from nearby APs). The probe request frames may include an SSID, may include a null SSID, or may include a destination address of a specific AP. When the probe request frame includes an SSID, all APs with a matching SSID that receive the probe request frame respond by transmitting a probe response frame. When the probe request frame includes a null SSID, all APs that receive the probe request frame respond by transmitting a probe response frame. When the probe request frame includes a destination address of a specific AP, only the AP indicated by the destination address transmits a probe response that will be "heard" by the STA 200.

Implementations of the subject matter described in this disclosure may be used to assist unassociated stations to discover suitable APs with which to associate. In some implementations, an AP may allocate a dedicated resource unit (RU) for advertising its discovery information to unassociated stations, may allocate one or more additional RUs for downlink (DL) transmissions to one or more associated stations, and may transmit a multi-user (MU) packet, over the dedicated RU and the one or more additional RUs, that includes a discovery frame carried on the dedicated RU and one or more non-discovery-related frames carried on the one or more additional RUs. The discovery frame may include discovery information intended for the unassociated stations, and the one or more non-discovery-related frames may include non-discovery-related information intended for the one or more associated stations. As such, the MU packet may be used to transmit discovery information to unassociated stations on the dedicated RU concurrently with the transmission of non-discovery-related DL information to the one or more associated stations. The MU packet may be a HE MU PPDU including a first MPDU to carry discovery frames to the unassociated stations, and including one or more second MPDUs to carry non-discovery-related frames to the one or more associated stations, concurrently. The HE MU PPDU may be transmitted using a downlink (DL) orthogonal frequency division multiple access (OFDMA) technique, and may include a preamble that spans the dedicated RU and each of the one or more additional RUs.

In some implementations, the preamble of the MU packet may be transmitted as a plurality of duplicates on corresponding portions or subbands of a frequency bandwidth, for example, such that a first duplicate containing a station association identification (STAID) value identifying the unassociated stations is transmitted on the dedicated RU, and one or more additional duplicates containing STAID values identifying some or all of the one or more associated stations are concurrently transmitted on the one or more additional RUs. In some aspects, the STAID value of the first duplicate may be set to a selected or predetermined value (such as 2045) that addresses the unassociated stations (but not the associated stations). The STAID value may be embedded within any suitable portion of the preamble of the HE MU PPDU. In some implementations, the STAID value may be embedded within the HE-SIG-B field of the preamble of the HE MU PPDU. In other implementations, a value of 2045 may be stored in the STA_ID field of the HE MU PPDU to indicate or identify unassociated stations as intended recipients of information carried on the dedicated RU.

Particular implementations of the subject matter described in this disclosure can be implemented to realize one or more of the following potential advantages. An AP typically transmits beacon frames every 100 milliseconds (ms) or time units (TUs) (such as once per each beacon interval specified by the IEEE 802.11 standards). If an unassociated station does not receive the beacon frames, then the unassociated station may transmit a probe request to initiate an active scanning operation. Although the AP may encourage passive scanning operations (rather than active scanning operations) by broadcasting beacon frames or discovery information more frequently, increasing the frequency with which individual beacon frames or discovery frames are transmitting from the AP may undesirably consume limited resources of the wireless medium.

In accordance with some aspects of the present disclosure, the AP may broadcast discovery information more frequently while reducing the impact to medium utilization by including its discovery information in MU packets that carry downlink (DL) information to one or more stations already associated with the AP. The AP may piggy-back its discovery information onto DL transmissions to associated stations by allocating a dedicated RU for advertising its discovery information to unassociated stations and allocating one or more different RUs for DL transmissions to associated stations. In this manner, the AP may facilitate discovery using passive scanning operations with little or no overhead, for example, because the discovery information for the unassociated stations may be aggregated with DL transmissions (such as DL MU PPDUs) for the associated stations, rather than broadcasted using separate single-user (SU) transmissions. In some aspects, the AP may broadcast or advertise its discovery information multiple times during each beacon interval, thereby not only reducing the amount of time during which unassociated stations need to activate their receive chains to listen for discovery information but also reducing the frequency with which the unassociated stations broadcast probe requests (such as to initiate active scanning operations).

In some other implementations, the discovery information contained in one or more DL MU PPDUs transmitted by an AP may include instructions for unassociated stations to refrain from initiating active scanning operations on a preferred scanning channel (PSC) of the AP, to refrain from initiating active scanning operations on non-preferred scanning channels (non-PSCs) of the AP for a predetermined duration, or both. In this manner, the AP may reduce congestion caused by active scanning operations on the non-PSCs and the PSC of the AP using instructions contained in DL MU PPDUs, for example, without transmitting separate messages on the wireless medium.

FIG. 1 is a block diagram of a wireless system 100 within which aspects of the present disclosure may be implemented. The wireless system 100 is shown to include four wireless stations STA1-STA4, a wireless access point (AP) 110, and a wireless local area network (WLAN) 120. The WLAN 120 may be formed by a plurality of Wi-Fi access points (APs) that may operate according to the IEEE 802.11 family of standards (or according to other suitable wireless protocols). Thus, although only one AP 110 is shown in FIG. 1 for simplicity, it is to be understood that the WLAN 120 may be formed by any number of access points such as the AP 110. The AP 110 may be assigned a unique media access control (MAC) address that is programmed therein by, for example, the manufacturer of the access point. Similarly, each of the stations STA1-STA4 may also be assigned a unique MAC address.

The AP 110 may also assign an association identification (AID) value to each of the stations STA1-STA4, for example, so that the AP 110 may identify the stations STA1-STA4 using their assigned AID values. The assigned AID values may also allow each of the stations STA1-STA4 to be individually identified and addressed by traffic indication map (TIM) elements (such as broadcast in one or more beacon frames) that indicate a presence of buffered downlink (DL) data in the AP 110. In some implementations, trigger frames broadcast by the AP 110 may use the assigned AID values to allocate resource units (RUs) to one or more identified STAs for the transmission of uplink (UL) data.

In some implementations, the WLAN 120 may allow for multiple-input multiple-output (MIMO) communications between the AP 110 and the stations STA1-STA4. The MIMO communications may include single-user MIMO (SU-MIMO) and multi-user MIMO (MU-MIMO) communications. In addition, or in the alternative, the WLAN 120 may utilize a multiple channel access mechanism such as, for example, an orthogonal frequency-division multiple access (OFDMA) mechanism. Although the WLAN 120 is depicted in FIG. 1 as an infrastructure basic service set (BSS), in other implementations, the WLAN 120 may be an independent basic service set (IBSS), an ad-hoc network, or a peer-to-peer (P2P) network (such as operating according to the Wi-Fi Direct protocols).

Each of the stations STA1-STA4 may be any suitable wireless device including, for example, a cell phone, personal digital assistant (PDA), tablet device, laptop computer, or the like. Each of the stations STA1-STA4 may also be referred to as a user equipment (UE), a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some implementations, each of the stations STA1-STA4 may include one or more transceivers, one or more processing resources, one or more memory resources, and a power source (such as a battery). The memory resources may include a non-transitory computer-readable medium (such as one or more nonvolatile memory elements, such as EPROM, EEPROM, Flash memory, a hard drive, etc.) that stores instructions for performing operations described below with respect to FIGS. 7, 8, 9A, and 9B.

The AP 110 may be any suitable device that allows one or more wireless devices to connect to a network (such as a local area network (LAN), wide area network (WAN), metropolitan area network (MAN), or the Internet) via the AP 110 using wireless communications such as, for example, Wi-Fi, Bluetooth, and cellular communications. In some implementations, the AP 110 may include one or more transceivers, one or more processing resources, one or more memory resources, and a power source. The memory resources may include a non-transitory computer-readable medium (such as one or more nonvolatile memory elements, such as EPROM, EEPROM, Flash memory, a hard drive, etc.) that stores instructions for performing operations described below with respect to FIGS. 7, 8, 9A, and 9B.

For the stations STA1-STA4 and the AP 110, the one or more transceivers may include Wi-Fi transceivers, Bluetooth transceivers, cellular transceivers, and any other suitable radio frequency (RF) transceivers (not shown for simplicity) to transmit and receive wireless communication signals. Each transceiver may communicate with other wireless devices in distinct operating frequency bands, using distinct communication protocols, or both. For example, the Wi-Fi transceiver may communicate within a 900 MHz frequency band, a 2.4 GHz frequency band, a 5 GHz frequency band, a 6 GHz frequency band, and a 60 MHz frequency band in accordance with the IEEE 802.11 standards. The Bluetooth transceiver may communicate within the 2.4 GHz frequency band in accordance with the standards provided by the Bluetooth Special Interest Group (SIG), in accordance with the IEEE 802.15 standards, or both. The cellular transceiver may communicate within various RF frequency bands in accordance with any suitable cellular communications standard.

Figure 2:
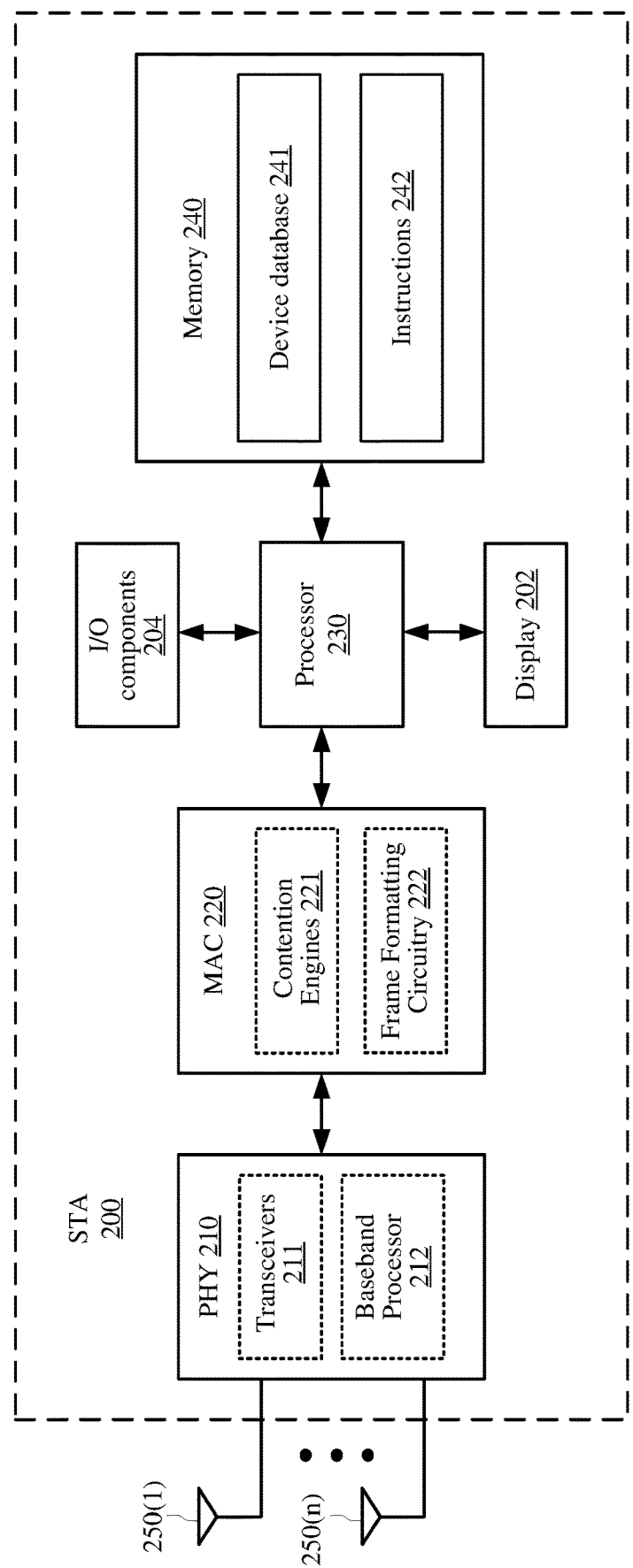
FIG. 2 shows a block diagram of an example wireless station.

FIG. 2 shows an example station (STA) 200. In some implementations, the STA 200 may be one example of the stations STA1-STA4 of FIG. 1. The STA 200 may include a display 202, input/output (I/O) components 204, a physical-layer device (PHY) 210, a MAC 220, a processor 230, a memory 240, and a number of antennas 250(1)-250(n).

The display 202 may be any suitable display or screen upon which items may be presented to a user (such as for viewing, reading, or watching). In some aspects, the display 202 may be a touch-sensitive display that allows for user interaction with the STA 200 and that allows the user to control one or more operations of the STA 2000. The I/O components 204 may be or include any suitable mechanism, interface, or device to receive input (such as commands) from the user and to provide output to the user. For example, the I/O components 204 may include (but are not limited to) a graphical user interface, keyboard, mouse, microphone, speakers, and so on.

The PHY 210 may include at least a number of transceivers 211 and a baseband processor 212. The transceivers 211 may be coupled to the antennas 250(1)-250(n), either directly or through an antenna selection circuit (not shown for simplicity). The transceivers 211 may be used to transmit signals to and receive signals from the AP 110 and other STAs (see also FIG. 1), and may be used to scan the surrounding environment to detect and identify nearby access points and other STAs (such as within wireless range of the STA 200). Although not shown in FIG. 2 for simplicity, the transceivers 211 may include any number of transmit chains to process and transmit signals to other wireless devices via the antennas 250(1)-250(n), and may include any number of receive chains to process signals received from the antennas 250(1)-250(n). In some implementations, the STA 200 may be configured for MIMO operations. The MIMO operations may include SU-MIMO operations and MU-MIMO operations. The STA 200 also may be configured for OFDMA communications and other suitable multiple access mechanisms, for example, as may be provided for in the IEEE 802.11ax standards.

The baseband processor 212 may be used to process signals received from the processor 230 or the memory 240 (or both) and to forward the processed signals to the transceivers 211 for transmission via one or more of the antennas 250(1)-250(n), and may be used to process signals received from one or more of the antennas 250(1)-250(n) via the transceivers 211 and to forward the processed signals to the processor 230 or the memory 240 (or both).

The MAC 220 may include at least a number of contention engines 221 and frame formatting circuitry 222. The contention engines 221 may contend for access to one more shared wireless mediums, and may also store packets for transmission over the one more shared wireless mediums. The STA 200 may include one or more contention engines 221 for each of a plurality of different access categories. In other implementations, the contention engines 221 may be separate from the MAC 220. For still other implementations, the contention engines 221 may be implemented as one or more software modules (such as stored in memory 240 or stored in memory provided within the MAC 220) containing instructions that, when executed by the processor 230, perform the functions of the contention engines 221.

The frame formatting circuitry 222 may be used to create and format frames received from the processor 230 (such as by adding MAC headers to PDUs provided by the processor 230), and may be used to re-format frames received from the PHY 210 (such as by stripping MAC headers from frames received from the PHY 210). Although the example of FIG. 2 depicts the MAC 220 coupled to the memory 240 via the processor 230, in other implementations, the PHY 210, the MAC 220, the processor 230, and the memory 240 may be connected using one or more buses (not shown for simplicity).

The processor 230 may be any suitable one or more processors capable of executing scripts or instructions of one or more software programs stored in the STA 200 (such as within the memory 240). In some implementations, the processor 230 may be or include one or more microprocessors providing the processor functionality and external memory providing at least a portion of machine-readable media. In other implementations, the processor 230 may be or include an Application Specific Integrated Circuit (ASIC) with the processor, the bus interface, the user interface, and at least a portion of the machine-readable media integrated into a single chip. In some other implementations, the processor 230 may be or include one or more Field Programmable Gate Arrays (FPGAs) or Programmable Logic Devices (PLDs).

The memory 240 may include a device database 241 that stores profile information for the STA 200 and for a number of other wireless devices such as APs and other STAs. The profile information for the STA 200 may include, for example, its MAC address, the BSSID of the basic service set to which the STA 200 belongs, bandwidth capabilities, supported channel access mechanisms, supported data rates, and so on. The profile information for a particular AP may include, for example, the AP's basic service set identification (BSSID), MAC address, channel information, received signal strength indicator (RSSI) values, goodput values, channel state information (CSI), supported data rates, connection history with the AP, a trustworthiness value of the AP (such as indicating a level of confidence about the AP's location, etc.), and any other suitable information pertaining to or describing the operation of the AP.

The memory 240 may also include a non-transitory computer-readable medium (such as one or more nonvolatile memory elements, such as EPROM, EEPROM, Flash memory, a hard drive, and so on) that may store computer-executable instructions 242 to perform all or a portion of one or more operations described in this disclosure.

The processor 230 may be one or more suitable processors capable of executing scripts or instructions of one or more software programs (such as instructions 242) stored within the memory 240. In some implementations, the processor 230 may be one or more general purpose processors that execute the instructions 242 to cause the STA 200 to perform any number of different functions or operations such as, for example, one or more operations of FIGS. 7, 8, 9A, and 9B. In additional or alternative aspects, the processor 230 may include integrated circuits or other hardware to perform functions or operations without the use of software. While shown to be coupled to each other via the processor 230 in the example of FIG. 2, the processor 230, the display 202, the I/O components 204, and the MAC 220 may be coupled to one another in various arrangements. For example, the processor 230, the display 202, the I/O components 204, and the MAC 220 may be coupled to each other via one or more local buses (not shown for simplicity).

Figure 3:
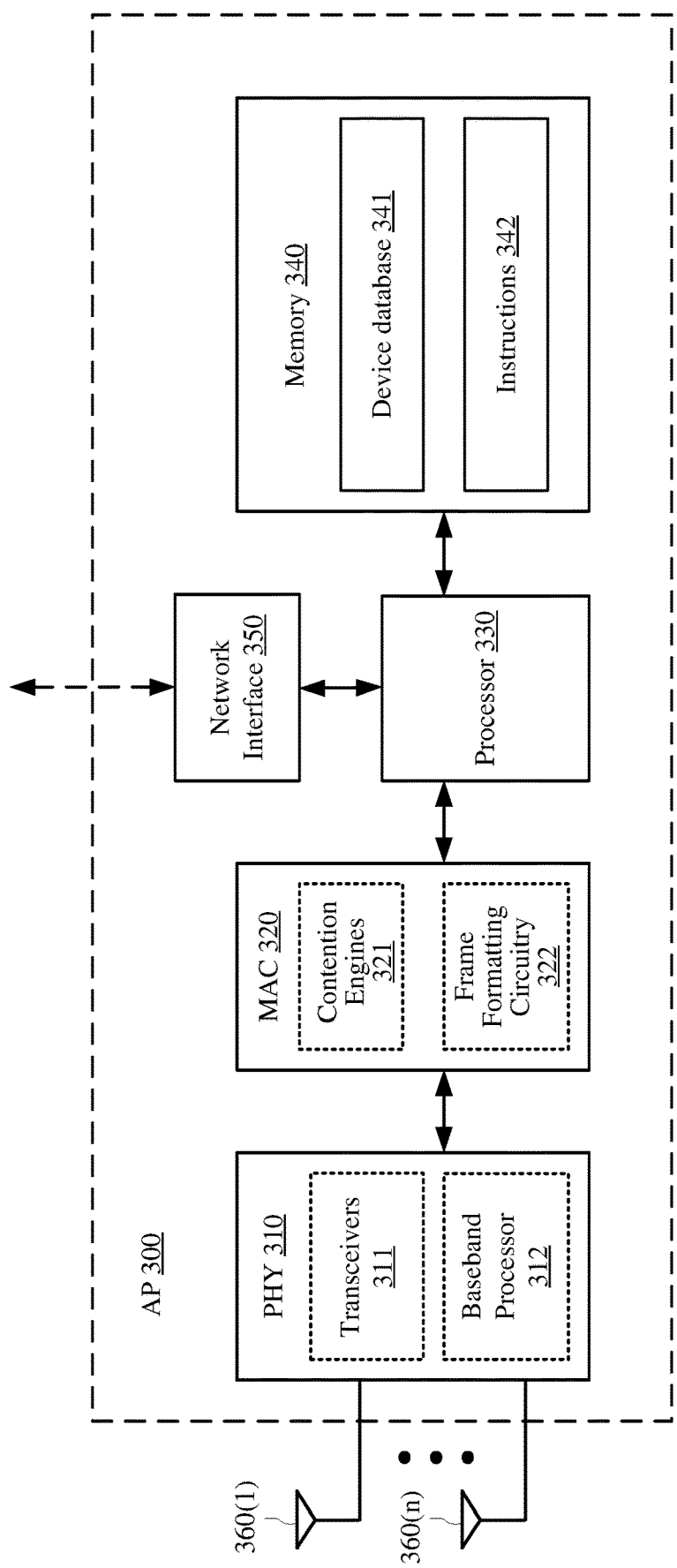
FIG. 3 shows a block diagram of an example wireless access point (AP).

FIG. 3 shows an example AP 300. The AP 300 may be one implementation of the AP 110 of FIG. 1. The AP 300 may include a PHY 310, a MAC 320, a processor 330, a memory 340, a network interface 350, and a number of antennas 360(1)-360(n). The PHY 310 may include at least a number of transceivers 311 and a baseband processor 312. The transceivers 311 may be coupled to the antennas 360(1)-360(n), either directly or through an antenna selection circuit (not shown for simplicity). The transceivers 311 may be used to communicate wirelessly with one or more STAs, with one or more other APs, and with other suitable devices. Although not shown in FIG. 3 for simplicity, the transceivers 311 may include any number of transmit chains to process and transmit signals to other wireless devices via the antennas 360(1)-360(n), and may include any number of receive chains to process signals received from the antennas 360(1)-360(n). In some implementations, the AP 300 may be configured for MIMO operations such as SU-MIMO operations and MU-MIMO operations. The AP 300 also may be configured for OFDMA communications and other suitable multiple access mechanisms, for example, as may be provided for in the IEEE 802.11ax standards.

The baseband processor 312 may be used to process signals received from the processor 330 or the memory 340 (or both) and to forward the processed signals to the transceivers 311 for transmission via one or more of the antennas 360(1)-360(n), and may be used to process signals received from one or more of the antennas 360(1)-360(n) via the transceivers 311 and to forward the processed signals to the processor 330 or the memory 340 (or both).

The network interface 350 may be used to communicate with a WLAN server (not shown for simplicity) either directly or via one or more intervening networks and to transmit signals.

The MAC 320 may include at least a number of contention engines 321 and frame formatting circuitry 322. The contention engines 321 may contend for access to the shared wireless medium, and may also store packets for transmission over the shared wireless medium. In some implementations, the AP 300 may include one or more contention engines 321 for each of a plurality of different access categories. In other implementations, the contention engines 321 may be separate from the MAC 320. For still other implementations, the contention engines 321 may be implemented as one or more software modules (such as stored in the memory 340 or within memory provided within the MAC 320) containing instructions that, when executed by the processor 330, perform the functions of the contention engines 321.

The frame formatting circuitry 322 may be used to create and format frames received from the processor 330 (such as by adding MAC headers to PDUs provided by the processor 330), and may be used to re-format frames received from the PHY 310 (such as by stripping MAC headers from frames received from the PHY 310). Although the example of FIG. 3 depicts the MAC 320 coupled to the memory 340 via the processor 330, in other implementations, the PHY 310, the MAC 320, the processor 330, and the memory 340 may be connected using one or more buses (not shown for simplicity).

The processor 330 may be any suitable one or more processors capable of executing scripts or instructions of one or more software programs stored in the AP 300 (such as within the memory 340). In some implementations, the processor 330 may be or include one or more microprocessors providing processor functionalities and external memory providing at least a portion of machine-readable media (such as instructions). In other implementations, the processor 330 may be one or more general purpose processors that execute instructions stored in the memory 340 to cause the AP 300 to perform any number of different functions or operations such as, for example, one or more operations of FIGS. 7, 8, 9A, and 9B. In additional or alternative aspects, the processor 330 may include integrated circuits or other hardware to perform functions or operations without the use of software. In some implementations, the processor 330 may be or include an Application Specific Integrated Circuit (ASIC) with the processor, the bus interface, the user interface, and at least a portion of the machine-readable media integrated into a single chip. In other implementations, the processor 330 may be or include one or more Field Programmable Gate Arrays (FPGAs) or Programmable Logic Devices (PLDs).

The memory 340 may include a device database 341 that stores profile information for a plurality of STAs. The profile information for a particular STA may include, for example, its MAC address, supported data rates, connection history with the AP 300, one or more RUs allocated to the STA, the BSS with which the STA is associated or to which the STA belongs, and any other suitable information pertaining to or describing the operation of the STA.

The memory 340 may also include a non-transitory computer-readable medium (such as one or more nonvolatile memory elements, such as EPROM, EEPROM, Flash memory, a hard drive, and so on) that may store computer-executable instructions 342 to perform all or a portion of one or more operations described in this disclosure.

The IEEE 802.11ax specification may introduce multiple access mechanisms, such as an orthogonal frequency-division multiple access (OFDMA) mechanism, to allow multiple STAs to transmit and receive data on a shared wireless medium at the same time. For a wireless network using OFDMA, the available frequency spectrum may be divided into a plurality of resource units (RUs) each including a number of different frequency subcarriers, and different RUs may be allocated or assigned (such as by an AP) to different wireless devices (such as STAs) at a given point in time. In this manner, multiple wireless devices may concurrently transmit data on the wireless medium using their assigned RUs or frequency subcarriers.

Figure 4A:
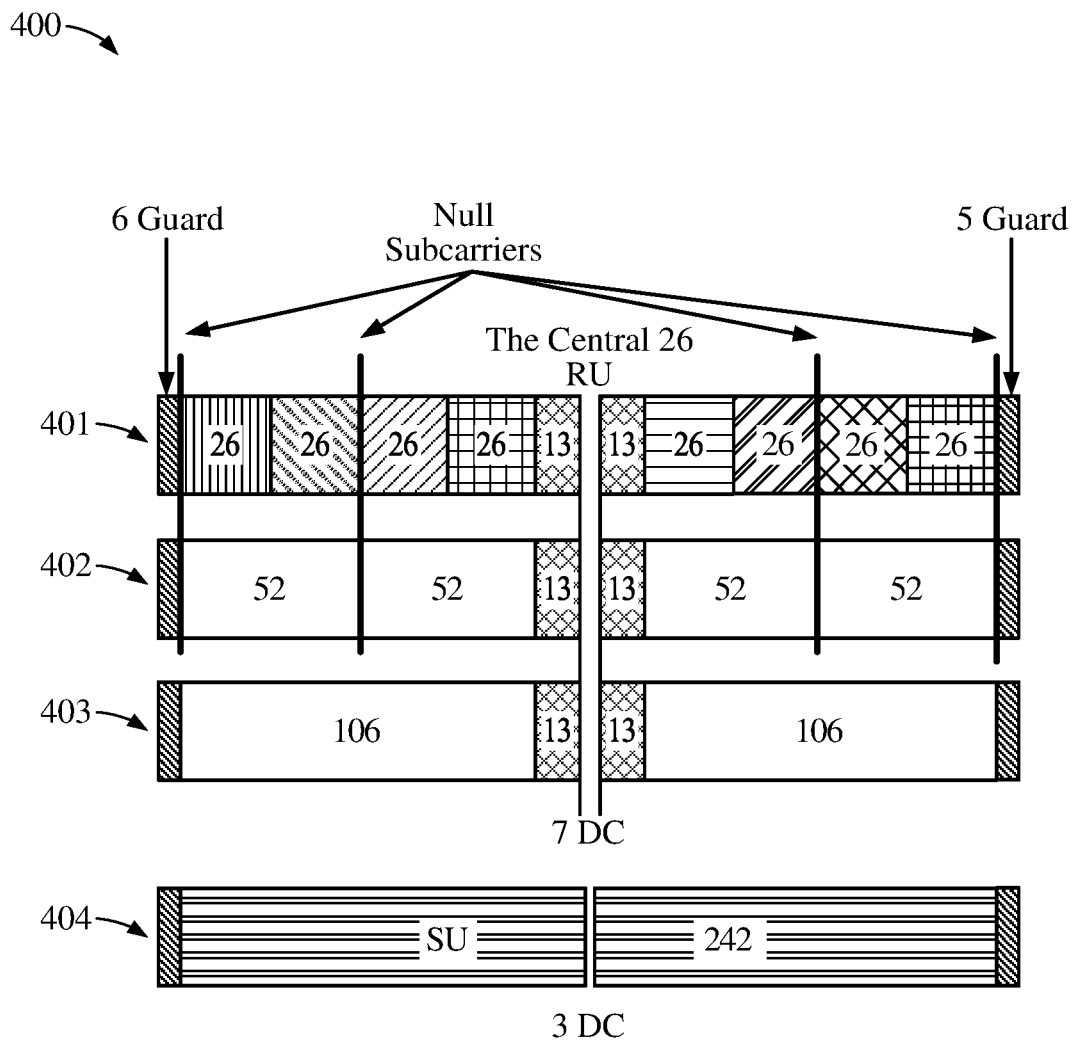
FIGS. 4A-4C show example subcarrier allocation diagrams for a 20 MHz bandwidth, a 40 MHz bandwidth, and an 80 MHz bandwidth, respectively.

FIG. 4A shows an example subcarrier allocation diagram 400 for a 20 MHz bandwidth according to the IEEE 802.11ax standards. The 20 MHz bandwidth may be divided into various numbers of resource units (RUs) each including a multitude of subcarriers. In some implementations, a first subcarrier allocation 401 may include eight RUs each including 26 tones, a second subcarrier allocation 402 may include four RUs each including 52 tones, a third subcarrier allocation 403 may include two RUs each including 106 tones, and a fourth subcarrier allocation 404 may include one RU including 242 tones (with the left half of the channel for single-user (SU) operations). Each 26-tone RU may include 24 data subcarriers and 2 pilot subcarriers, each 52-tone RU may include 48 data subcarriers and 4 pilot subcarriers, each 106-tone RU may include 102 data subcarriers and 4 pilot subcarriers, and the 242-tone RU may include 234 data subcarriers and 8 pilot subcarriers. For each of the example subcarrier allocations 401-404 depicted in FIG. 4A, adjacent RUs may be separated by a null subcarrier (such as a DC subcarrier), for example, to reduce interference between adjacent RUs, to reduce receiver DC offset, and to avoid transmit center frequency leakage.

Figure 4B:
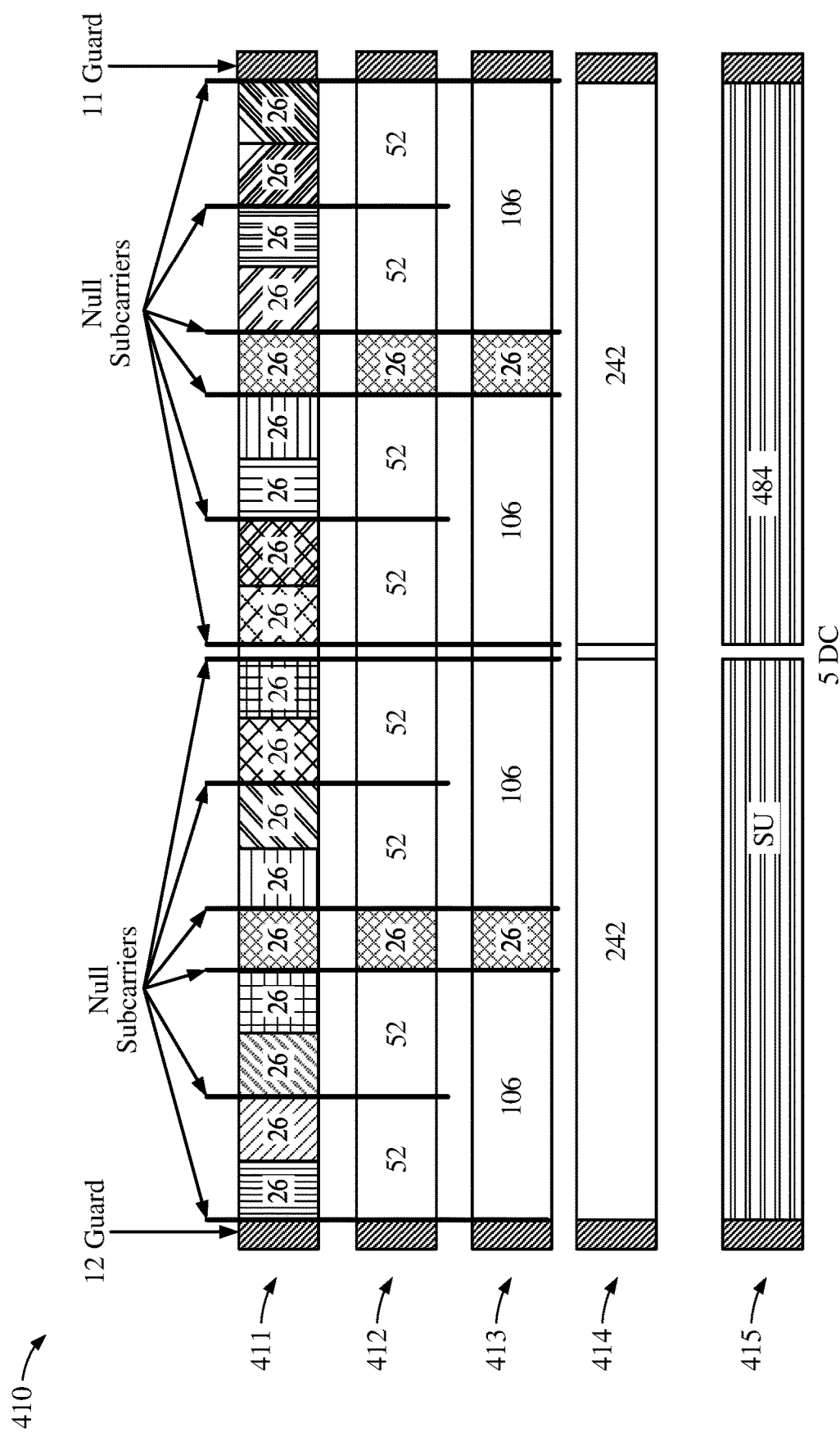

FIG. 4B shows an example subcarrier allocation diagram 410 for a 40 MHz bandwidth according to the IEEE 802.11ax standards. The 40 MHz bandwidth may be divided into various numbers of RUs each including a multitude of subcarriers. In some implementations, a first subcarrier allocation 411 may include eighteen RUs each including 26 tones, a second subcarrier allocation 412 may include eight RUs each including 52 tones, a third subcarrier allocation 413 may include four RUs each including 106 tones, a fourth subcarrier allocation 414 may include two RUs each including 242 tones, and a fifth subcarrier allocation 415 may include one RU including 484 tones (with the left half of the channel for SU operations). Each 26-tone RU may include 24 data subcarriers and 2 pilot subcarriers, each 52-tone RU may include 48 data subcarriers and 4 pilot subcarriers, each 106-tone RU may include 102 data subcarriers and 4 pilot subcarriers, each 242-tone RU may include 234 data subcarriers and 8 pilot subcarriers, and the 484-tone RU may include 468 data subcarriers and 16 pilot subcarriers. For each of the example subcarrier allocations 411-415 depicted in FIG. 4B, adjacent RUs may be separated by a null subcarrier, for example, to reduce interference between adjacent RUs, to reduce receiver DC offset, and to avoid transmit center frequency leakage.

Figure 4C:
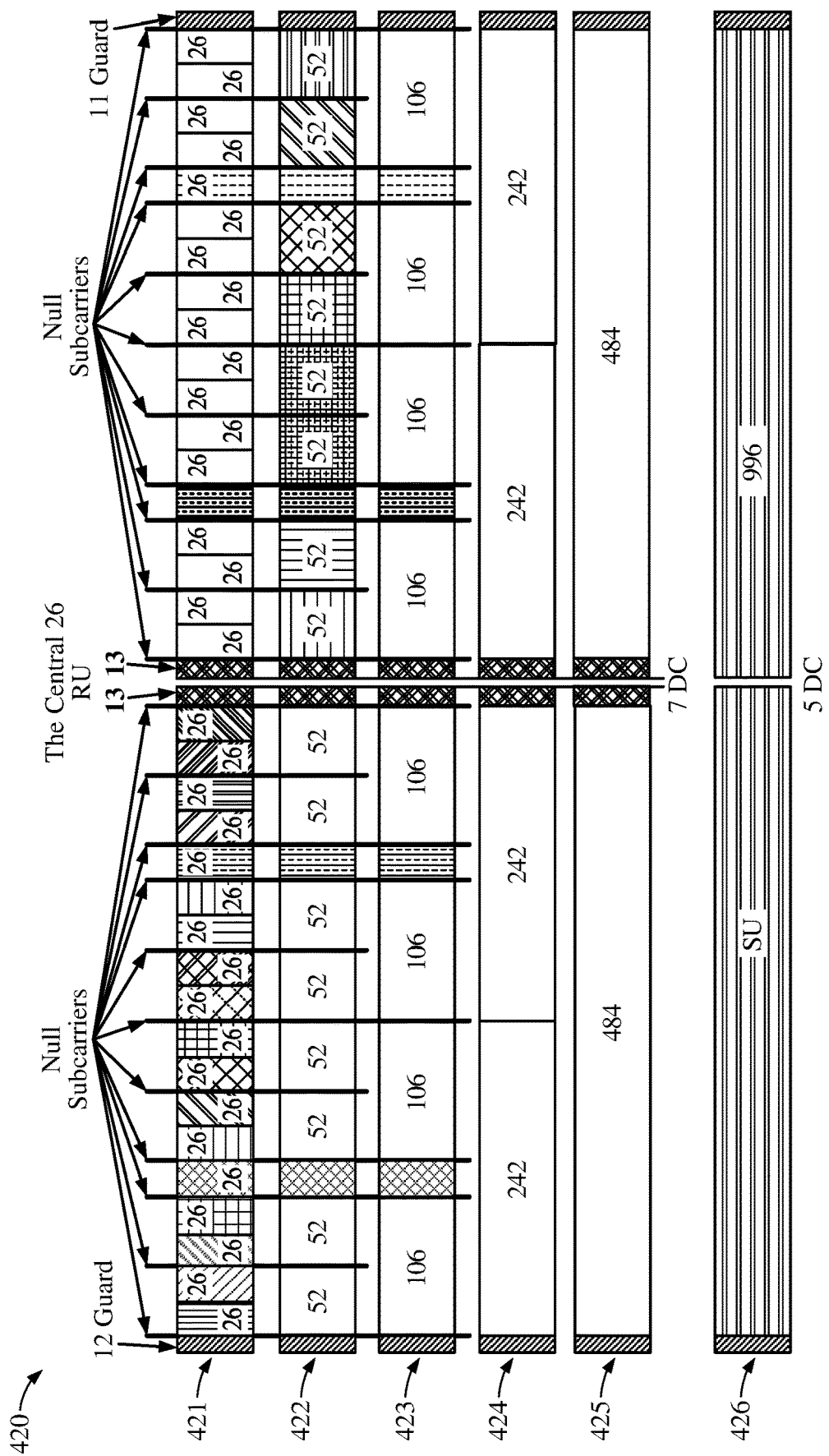

FIG. 4C shows an example subcarrier allocation diagram 420 for an 80 MHz bandwidth according to the IEEE 802.11ax standards. The 80 MHz bandwidth may be divided into various numbers of RUs each including a multitude of subcarriers. In some implementations, a first subcarrier allocation 421 may include thirty-six RUs each including 26 tones, a second subcarrier allocation 422 may include eighteen RUs each including 52 tones, a third subcarrier allocation 423 may include eight RUs each including 106 tones, a fourth subcarrier allocation 424 may include four RUs each including 242 tones, a fifth subcarrier allocation 425 may include two RUs each including 484 tones, and a sixth subcarrier allocation 426 may include one RU including 996 tones (with the left half of the channel for SU operations). Each 26-tone RU may include 24 data subcarriers and 2 pilot subcarriers, each 52-tone RU may include 48 data subcarriers and 4 pilot subcarriers, each 106-tone RU may include 102 data subcarriers and 4 pilot subcarriers, each 242-tone RU may include 234 data subcarriers and 8 pilot subcarriers, each 484-tone RU may include 468 data subcarriers and 16 pilot subcarriers, and the 996-tone RU may include 980 data subcarriers and 16 pilot subcarriers. For each of the example subcarrier allocations 421-426 depicted in FIG. 4C, adjacent RUs may be separated by a null subcarrier, for example, to reduce interference between adjacent RUs, to reduce receiver DC offset, and to avoid transmit center frequency leakage.

An AP may allocate specific or dedicated RUs to a number of associated STAs using a trigger frame. In some implementations, the trigger frame may identify a number of STAs associated with the AP, and may solicit uplink (UL) multi-user (MU) data transmissions from the identified STAs using their allocated RUs. The trigger frame may use AID values assigned by the AP to identify which STAs are to transmit UL data to the AP in response to the trigger frame. In some aspects, the trigger frame may indicate the RU size and location, the modulation and coding scheme (MCS), and the power level for UL transmissions to be used by each of the STAs identified in the trigger frame. As used herein, the RU size may indicate the bandwidth of the RU, and the RU location may indicate which frequency subcarriers are allocated to the RU.

Aspects of the present disclosure may increase the speed with which unassociated STAs can discover an AP using passive scanning operations by broadcasting discovery information of the AP more frequently than beacon frames, thereby reducing a time period during which unassociated STAs wait to receive information needed to discover the AP and to determine its operating parameters. In some implementations, the AP may transmit fast initial link setup (FILS) discovery frames containing discovery information of the AP at regular intervals within each beacon interval of the AP. For one example, the AP may broadcast FILS discovery frames at least once every 15 ms (and thus transmit discovery information to unassociated stations as many as 6 times during each 100 ms beacon interval). In some implementations, the discovery information may include any number of a unique identifier of the AP (such as an identifier indicative of its SSID or its MAC address), a traffic indication map (TIM) element, a target wait time (TWT) element, an opportunistic power save (OPS) element, MCS rates, operating channels, operating classes, BSS bandwidth, transmit power limits, security parameters, and other capabilities or characteristics of the AP. Unassociated stations may use the received discovery information to discover the AP, to determine the operating parameters, capabilities, and other characteristics of the AP, to send a management frame in an HE TB PPDU in response to a trigger frame allocating random access RUs to unassociated stations, or any combination thereof.

Recent revisions to the IEEE 802.11 standards governing wireless transmissions in the 6 GHz frequency band may designate certain frequency sub-bands or channels as preferred scanning channels to assist STAs to discover the presence of nearby APs operating in the 6 GHz frequency spectrum. In some implementations, an AP may set up a BSS to have a primary 20 MHz channel designated as a PSC and one or more secondary channels of various bandwidths designated as non-PSCs. STAs may initiate active scanning operations (such as by transmitting probe requests) on the non-PSCs only if the presence of an AP operating on the non-PSCs has been discovered through the receipt of a discovery frame from the AP. Unassociated stations may initiate active scanning operations on the preferred scanning channels after waiting for 20 TUs. In some other implementations, the discovery information contained in one or more DL MU PPDUs transmitted by an AP may include instructions for unassociated stations to refrain from initiating active scanning operations on the PSC (or the primary channel) of the AP, to refrain from initiating active scanning operations on non-PSCs of the AP for a predetermined duration, or both. In this manner, the AP may inform unassociated stations of active scanning restrictions on the PSC and one or more non-PSCs of the AP without periodically transmitting separate broadcast messages on the wireless medium, which may reduce congestion on the shared wireless medium.

Figure 5:
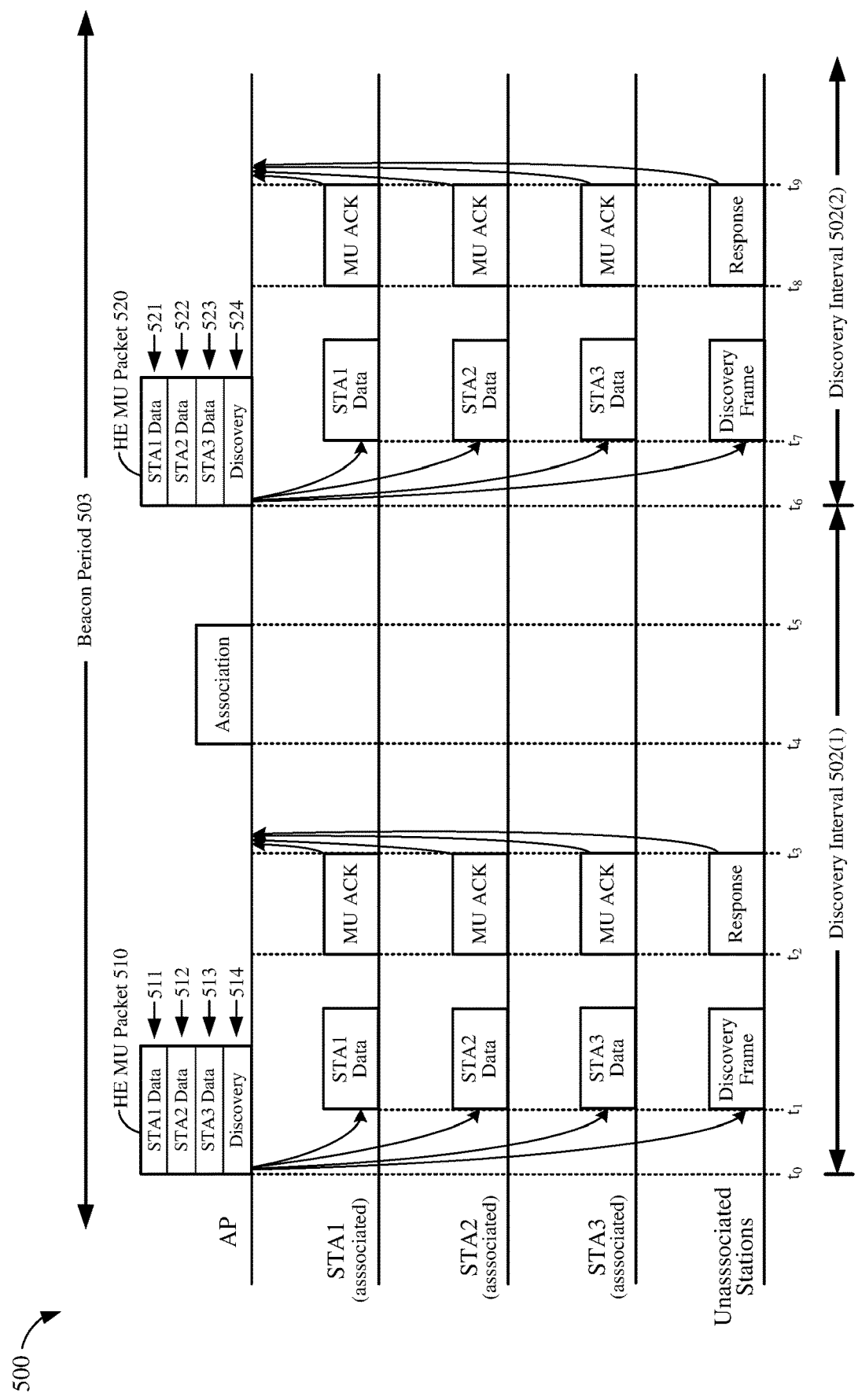
FIG. 5 shows a sequence diagram depicting an example operation for wireless communication.

FIG. 5 shows a sequence diagram depicting an example operation 500 for wireless communication. The AP of FIG. 5 may be any suitable AP including, for example, the AP 110 of FIG. 1 or the AP 300 FIG. 3. For purposes of discussion herein, each of the stations STA1-STA3 is associated with the AP, and the unassociated stations are not associated with the AP. Each of the associated stations STA1-STA3 and the unassociated stations of FIG. 5 may be any suitable wireless station including, for example, the stations STA1-STA4 of FIG. 1 or the STA 200 of FIG. 2.

In some implementations, the AP may contend for medium access during a backoff period or a point coordination function (PCF) interframe space (PIFS) duration. In other implementations, the AP may contend for medium access using another suitable channel access mechanism. In some other implementations, the AP may utilize a multiple channel access mechanism, for example, and may not contend for medium access.

The AP gains access to the wireless medium at time to, and may transmit a MU packet 510 on a DL channel using OFDMA, MU-MIMO, or a combination of both. In some implementations, the MU packet 510 may be a high efficiency (HE) MU physical layer convergence protocol (PCLP) protocol data unit (PPDU). The MU packet 510 may include a plurality of PLCP service data units (PSDUs), each of which may carry one or more MAC protocol data units (MPDUs). In some instances, each PSDU may carry an aggregated MPDU (A-MPDU) that includes an aggregation of multiple MPDUs or subframes that can be transmitted on different RUs (or different groups of RUs). In some implementations, the MU packet 510 may include a first MPDU (such as a FILS discovery frame or a probe response frame) containing discovery information of the AP, and may include one or more additional MPDUs each containing DL information for a corresponding associated station. In some implementations, the discovery information may include one or more of a unique identifier of the AP (such as an identifier indicative of its SSID or its MAC address), a TIM element, a TWT element, an OPS element, MCS rates, operating channels, operating classes, BSS bandwidth, transmit power limits, security parameters, and other capabilities or characteristics of the AP.

In some implementations, discovery information may be transmitted on a dedicated RU, and non-discovery-related information may be transmitted on one or more additional RUs different from the dedicated RU. The dedicated RU may be any RU selected by the AP for transmitting discovery information to unassociated stations. In some aspects, a station identification STAID value provided within the HE SIG-B field of an HE packet preamble may be set to a value (such as AID=2045) to indicate that the corresponding RU is intended for unassociated stations and is dedicated for the transmission of discovery information. In other implementations, the discovery information may be transmitted on a broadcast RU.

For the example of FIG. 5, the MU packet 510 includes four MPDUs 511-514 that may be transmitted to multiple users at the same time using different RUs. The first MPDU 511 includes data intended for STA1, the second MPDU 512 includes data intended for STA2, the third MPDU 513 includes data intended for STA3, and the fourth MPDU 514 includes discovery information that may be used by the unassociated stations to identify the AP and to determine whether to associate with the AP. In this manner, the AP may advertise its discovery information to the unassociated stations using the same MU packet 510 that delivers DL information (such as data frames, control frames, management frames, or any combination thereof) to one or more associated stations.

The discovery information may be contained in any suitable frame including, for example, a beacon frame, a FILS discovery frame, a probe response frame, or a broadcast frame. In some implementations, the discovery information may include one or more of a unique identifier of the AP (such as an identifier indicative of its SSID or its MAC address), a TIM element, a TWT element, an OPS element, MCS rates, operating channels, operating classes, BSS bandwidth, transmit power limits, security parameters, and other capabilities or characteristics of the AP. In addition, or in the alternative, the discovery information may include one or more of a request for the unassociated stations to use on-channel tunneling (OCT), an indication of whether the AP is part of a multiple basic service set identifier (BSSID) set, an indication of whether the AP is a transmitted BSSID or a non-transmitted BSSID, an indication of whether the AP is a member of an extended basic service set (ESS) in which all member APs operating in the same portion of a 6 GHz frequency band have a co-located AP operating in a 2.4 GHz frequency band or a 5 GHz frequency band, or an indication of whether the AP is a member of an ESS in which all member APs operating in the same band periodically transmit unsolicited probe response frames. In some other implementations, the discovery information may also include one or more of instructions for unassociated stations to maintain the transmit power below a value, to refrain from initiating active scanning operations on non-preferred scanning channels of the AP, or to refrain from initiating active scanning operations on a preferred scanning channel of the AP for a predetermined duration. In other implementations, the discovery information may be a hash value or a partial hash value of at least one of the SSID of the AP or the MAC address of the AP, as described with respect to FIGS. 6A-6B.

At time $t_1$, one or more of the unassociated stations may receive the discovery frame in the MPDU 514 transmitted on the dedicated RU, and the associated stations STA1-STA3 may receive DL data in respective MPDUs 511-513 transmitted on the one or more additional RUs. The associated stations STA1-STA3 may acknowledge reception of the DL data by transmitting ACK frames to the AP at time $t_2$. In some implementations, the associated stations STA1-STA3 may transmit the ACK frames in a UL MU-MIMO packet or in a UL MU PPDU. The one or more unassociated stations may decode discovery information contained in the discovery frame to discover the identity of the AP and to determine a number of operating parameters of the AP. In some implementations, the one or more unassociated stations may acknowledge reception of the discovery information by transmitting a response frame to the AP at time $t_2$. In addition, or in the alternative, the one or more unassociated stations may use the received discovery information to determine whether to associate with the AP and join the BSS operated by the AP.

At time $t_3$, the AP may receive the ACK frames transmitted by the associated stations STA1-STA3, and may receive one or more response frames transmitted by the one or more unassociated stations. If a particular response frame indicates that a corresponding one of the unassociated stations desires to join the BSS operated by the AP, the AP may perform an association operation with the corresponding unassociated station between times $t_4$ and $t_5$.

At time $t_6$, which may indicate the end of a first discovery interval 502(1) and the beginning of a second discovery interval 502(2), the AP may transmit a second MU packet 520 containing DL information for its associated stations STA1-STA3 and containing discovery information for other unassociated stations (such as unassociated stations that did not associate with the AP between times $t_4$ and $t_5$). In some implementations, the second MU packet 520 may deliver discovery information to the other unassociated stations using the dedicated RU while concurrently delivering DL information to the associated stations STA1-STA3 on the one or more additional RUs.

The second discovery interval 502(2) may have a same or similar duration as the first discovery interval 502(1). In some implementations, the discovery intervals 502(1) and 502(2) may be approximately 15 ms long, which is shorter than the beacon interval 503 of the AP. In this manner, the AP may advertise its discovery information multiple times during the beacon interval 503.

In other implementations, the AP may provide discovery information in the preamble of a HE MU PPDU (rather than in a discovery frame embedded in the HE MU PPDU). In some implementations, the discovery information may be a hash value of at least one of the SSID or the MAC address of the AP. In implementations for which the hash value fits within one or more available fields of the HE MU PPDU preamble, the AP may transmit the hash value in the preambles of any number of HE MU PPDUs. In implementations for which the hash value does not fit within available fields or bit locations of the HE MU PPDU preamble, the AP may divide the hash value into a plurality of portions (such that each portion of the hash value fits within available space in a respective HE MU PPDU preamble). By providing portions of the hash value within the preambles of different HE MU PPDUs transmitted from the AP (rather than in a discovery frame embedded in the HE MU PPDU), the AP may reduce medium access latencies and airtime usage— particularly when the HE MU PPDUs contain DL data for one or more stations associated with the AP.

Figure 6A:
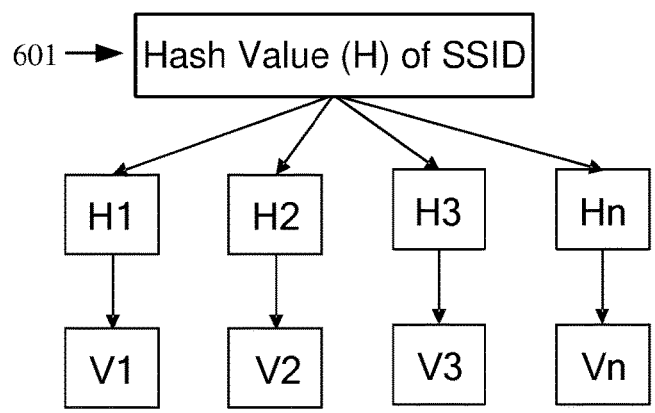
FIG. 6A shows an illustration depicting an example operation for generating a hash value of a unique identifier of an AP.

FIG. 6A shows an illustration depicting an example operation 600 for generating a hash value of a unique identifier of an AP (the AP is not shown for simplicity). In some implementations, the AP may perform a hash function on another unique identifier of the AP (such as its MAC address) to generate a hash value. In some other implementations, the AP may use a fountain code rather than hash values.

The AP may divide the hash value 601 into a plurality of hash value portions H1-H4, and then insert each of the hash value portions H1-H4 into the preambles of a corresponding group or sequence of HE MU PPDUs. The AP may transmit each of the hash value portions H1-H4 as respective values V1-V4 embedded into the preambles of different MU packets (such as HE MU PPDUs). The preambles of the HE MU PPDUs may span the dedicated RU and each of the one or more additional RUs, and the HE MU PPDUs may be transmitted using DL OFDMA techniques. In some implementations, the hash value portion may be stored in the Spatial Re-use field of the preamble's SIG-A field. In other implementations, the hash value portion may be stored in a new field of the preamble (such as part of an Extreme High-Throughput (EHT) standard). In some other implementations, the hash value portion may be carried in the idle tones when transmitting 20 MHz PPDUs and 40 MHz PPDUs.

Figure 6B:
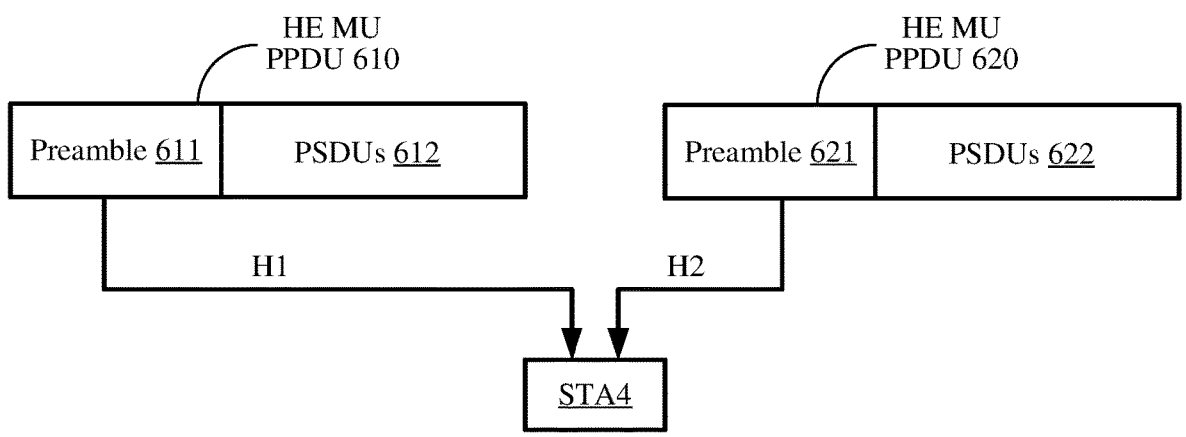
FIG. 6B shows an illustration depicting an example operation for determining discovery information from a number of partial hash values.

FIG. 6B shows an illustration depicting an example operation 605 for determining discovery information from a number of received hash value portions. An unassociated station (not shown for simplicity) may receive a plurality of MU packets from the AP (at least two of which include a preamble containing different portions of the hash value 601), may extract one or more portions of the hash value from a number of the received packets, and may estimate the hash value based on the one or more portions of the hash value extracted from the received packets. As an example, an unassociated station may receive a first HE MU PPDU 410 and a second HE MU PPDU 420. The first HE MU PPDU 410 may include the first hash value portion H1, and the second HE MU PPDU 420 may include the second hash value portion H2. The unassociated station may use the hash value portions H1 and H2 to estimate the hash value 601 of the AP. In this manner, the unassociated station may derive the hash value 601 without receiving all of the hash value portions H1-H4, which may reduce the time needed to identify the AP.

In some implementations, stations may determine that more than a certain number or percentage of the hash value portions are to be received when estimating the hash value of the AP's unique identifier. As an example, if a particular station received less than a threshold number or percentage of the hash value portions, then the station may wait to receive additional hash value portions prior to estimating the AP's hash value. In addition, or in the alternative, the station may use the color of the AP's BSS (as indicated in the preambles of the HE MU PPDUs) to verify that a given HE MU PPDU was transmitted from a certain AP.

Figure 7:
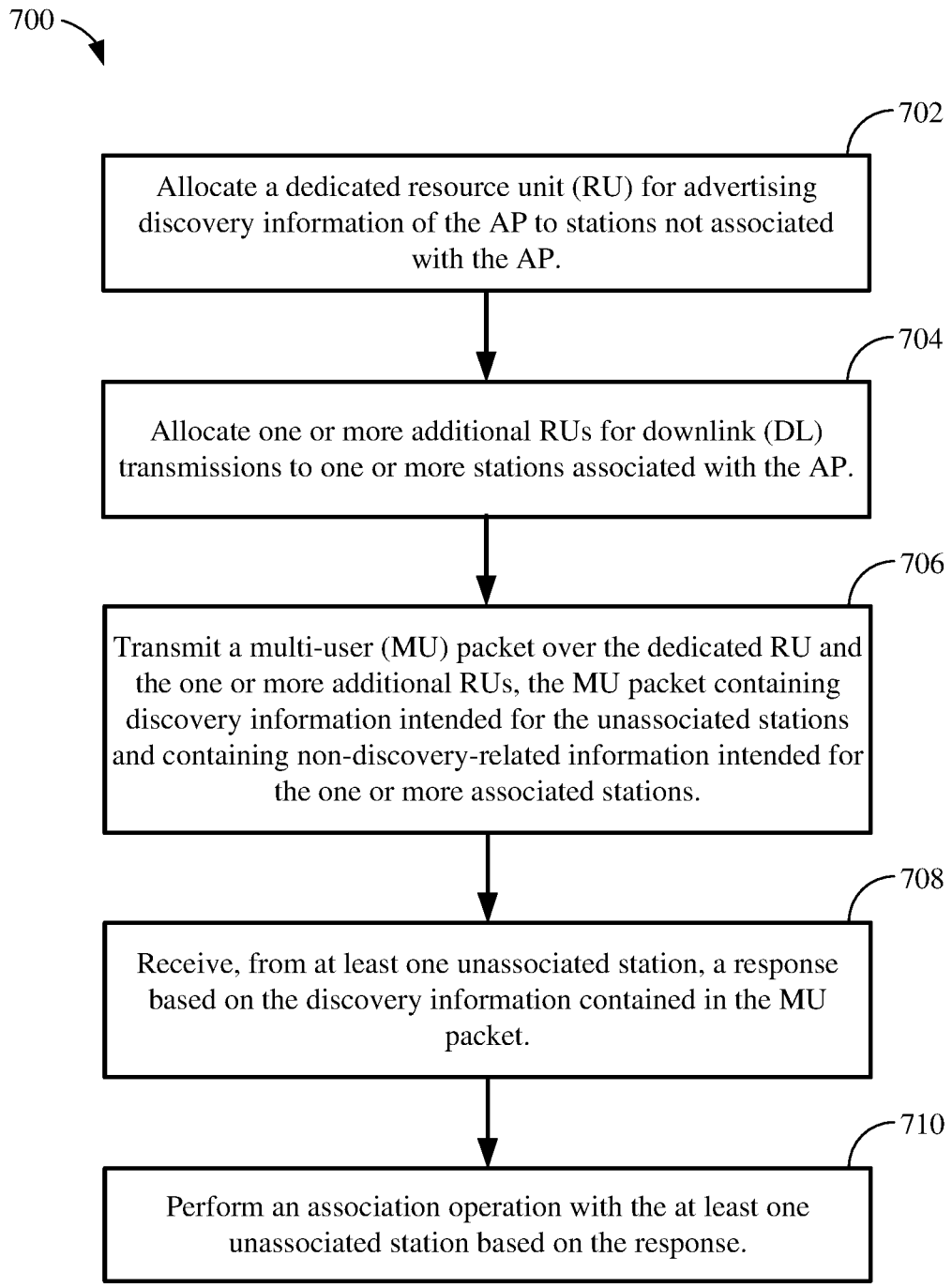
FIG. 7 shows an illustrative flow chart depicting an example process for wireless communication.

FIG. 7 shows an illustrative flow chart depicting an example process 700 for wireless communication. In some implementations, the example process 700 may be performed by a wireless communication device operating as or within an AP, such as the AP 110 of FIG. 1, the AP 300 of FIG. 3, or the AP of FIG. 5.

The process 700 may begin in block 702 with the AP allocating a dedicated resource unit (RU) for advertising discovery information of the AP to unassociated stations. In some implementations, the AP may select the size and location of the RU that is to be dedicated for advertising discovery information of the AP. In other implementations, the dedicated RU may be specified by the IEEE 802.11 standards.

At block 704, the process 700 proceeds with the AP allocating one or more additional RUs for DL transmissions to one or more stations associated with the AP. In some implementations, the AP may select the sizes and locations of the one or more additional RUs that carry DL transmissions to the associated stations. In some aspects, the DL transmissions may include one or more of data frames, control frames, or management frames.

At block 706, the process 700 proceeds with the AP transmitting, over the dedicated RU and the one or more additional RUs, a MU packet containing discovery information intended for the unassociated stations and containing non-discovery-related information intended for the one or more associated stations. In some implementations, the MU packet may include a discovery frame carried on the dedicated RU and containing the discovery information intended for the unassociated stations, and may also include one or more non-discovery-related frames carried on the one or more additional RUs and containing the non-discovery-related information intended for the one or more associated stations.

The MU packet may be a HE MU PPDU, the discovery frame may be a first MPDU containing the discovery information for the unassociated stations, and each of the one or more non-discovery-related frames may be a respective second MPDU containing non-discovery-related information intended for a corresponding one of the stations associated with the AP. The HE MU PPDU may be transmitted using a DL OFDMA technique, and the discovery information may be transmitted on the dedicated RU concurrently with the transmission of the one or more non-discovery-related frames on the one or more additional RUs. The discovery frame may be a FILS discovery frame, a probe response frame, a broadcast frame, or any other suitable frame or message.

The HE MU PPDU may include a preamble spanning the dedicated RU and each of the one or more additional RUs, for example, by duplicating the preamble for each 20 MHz channel segment of the frequency spectrum associated with the AP. In some implementations, the preamble may include a first duplicate transmitted on the dedicated RU, and may include one or more additional duplicates transmitted on the one or more additional RUs. The first duplicate may include a station association identification (STAID) value set to a selected value (such as AID=2045) indicating that the discovery information carried on the dedicated RU is intended for unassociated stations, and each duplicate of the one or more additional duplicates may include a STAID value identifying at least one station of the one or more associated stations to which non-discovery related information carried on a corresponding one of the additional RUs is intended. The STAID values may be embedded within any suitable portion of the preamble of the HE MU PPDU, or within in a field of a frame carrying the discovery information. In some implementations, the STAID values may be embedded within the HE-SIG-B field of the preamble of the HE MU PPDU.

In some implementations, the discovery information may include one or more of a unique identifier of the AP, a TIM element, a TWT element, an OPS element, a MCS, an operating channel, an operating class, a BSS bandwidth, a transmit power limit, or a security parameter. In some other implementations, the discovery information may include one or more of a request for the unassociated stations to use OCT, an indication of whether the AP is part of a multiple BSSID set, an indication of whether the AP is a transmitted BSSID or a non-transmitted BSSID, an indication of whether the AP is a member of an ESS in which all member APs operating in the same portion of a 6 GHz frequency band have a co-located AP operating in a 2.4 GHz frequency band or a 5 GHz frequency band, or an indication of whether the AP is a member of an ESS in which all member APs operating in the same band periodically transmit unsolicited probe response frames.

In addition, or in the alternative, the discovery information may include a value, embedded in a signaling field of a preamble of the MU packet or in a field of a frame carrying the discovery information, indicating whether active scanning operations are permitted on a wireless channel associated with the AP. In some implementations, the discovery information may include one or more of instructions for the unassociated station to maintain the transmit power below a value, to refrain from initiating active scanning operations on non-preferred scanning channels of the AP, or to refrain from initiating active scanning operations on a preferred scanning channel of the AP for a predetermined duration. In some aspects, the predetermined duration may be 20 time units (TUs), although other suitable numbers of TUs may be used for the predetermined duration.

At block 708, the process 700 proceeds with the AP receiving, from at least one unassociated station, a response based on the discovery information contained in the MU packet. The response may be any suitable response frame (such as a probe response frame) that acknowledges receipt of the discovery information and provides identifying information of the receiving station to the AP. The identifying information, which may include the station's MAC address, supported data rates, capabilities, supported protocols, and other information, may be used by the AP to establish a wireless connection (such as to associate) with the receiving station.

At block 710, the process 700 proceeds with the AP performing an association operation with the at least one unassociated station based on the response. Once the receiving station is associated with the AP, the receiving station may receive DL transmissions from the AP and may transmit UL data to the AP (such as in response to a trigger frame transmitted by the AP).

Figure 8:
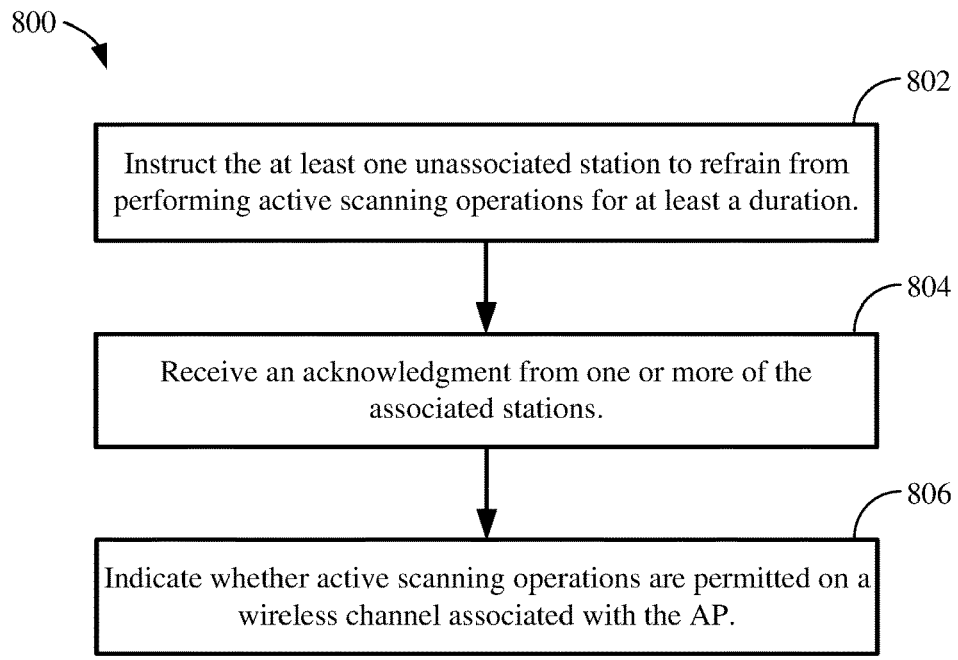
FIG. 8 shows an illustrative flow chart depicting another example process for wireless communication.

FIG. 8 shows an illustrative flow chart depicting an example process 800 for wireless communication. In some implementations, the example process 800 may be performed after the association operation in block 710 of FIG. 7. In other implementations, the example process 800 may be performed concurrently with one of the processes described with respect to FIG. 7. The process 800 may begin in block 802 with the AP instructing the at least one unassociated station to refrain from initiating active scanning operations for at least a duration. In some implementations, the instruction may cause the unassociated stations to delay active scanning operations for a duration after detecting an idle channel so that the unassociated stations can discover the AP using passive scanning operations (rather than using active scanning operations). In some aspects, the duration may be 15 ms, although other suitable durations may be used.

At block 804, the process 800 proceeds with the AP receiving an acknowledgment from one or more of the associated stations. Each of the acknowledgements, which may be any suitable acknowledgment (ACK) frame, may inform the AP that a corresponding one of the associated stations received the DL information (such as data, management information, or control information) contained in the HE MU PPDU. In some implementations, the acknowledgment frames may be transmitted to the AP as SU-ACK frames. In other implementations, the acknowledgment frames may be transmitted to the AP as MU-ACK frames.

At block 806, the process 800 proceeds with the AP indicating whether active scanning operations are permitted on a wireless channel associated with the AP. The indication may be stored in a new bit location of the HE MU PPDU preamble, in a currently unused bit of the preamble (such as bit 23 in the SIG-B field) of the HE MU PPDU, or in any other suitable portion of the HE MU PPDU. In some implementations, the indication may correspond to a PSC of the AP, to one or more non-PSCs of the AP, or both.

Figure 9:
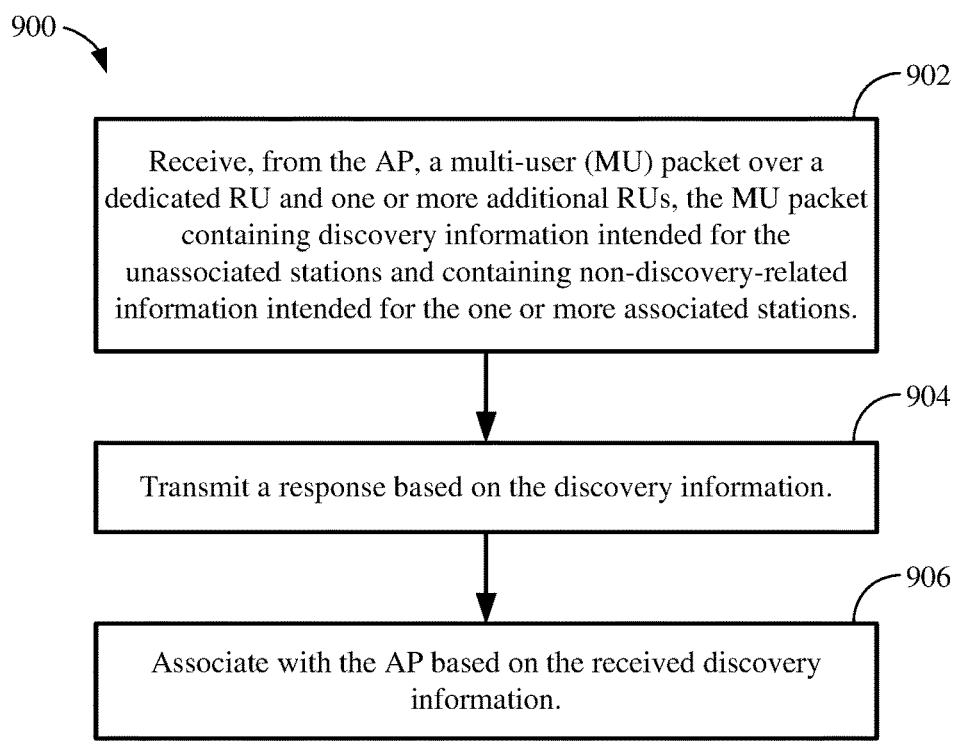
FIG. 9 shows an illustrative flow chart depicting another example process for wireless communication.

FIG. 9 shows an illustrative flow chart depicting an example process 800 for wireless communication. The example process 900 may be performed by a wireless station that is not associated with the AP. In some implementations, the example process 900 may be performed by a wireless communication device operating as or within a wireless station such as one of the stations STA1-STA4 of FIG. 1, the station 200 of FIG. 3, or the station STA4 of FIG. 5.

In some implementations, the process 900 begins at block 902 with STA receiving, from the AP, a multi-user (MU) packet over a dedicated RU and one or more additional RUs. The MU packet may contain discovery information intended for the unassociated stations, and may contain non-discovery-related information intended for the one or more associated stations. In some implementations, the MU packet may include a discovery frame carried on the dedicated RU and containing the discovery information intended for the unassociated stations, and may also include one or more non-discovery-related frames carried on the one or more additional RUs and containing the non-discovery-related information intended for the one or more associated stations. The discovery information, which may be included in a FILS discovery frame, a probe response frame, a broadcast frame, or other suitable frame, includes a value identifying the AP. In some implementations, the value may be at least one of a SSID of the AP or a MAC address of the AP. In other implementations, the value may be a hash value of the SSID of the AP or the MAC address of the AP. In some other implementations, the value may be a portion of the hash value of the SSID of the AP or the MAC address of the AP.

The MU packet may be a HE MU PPDU, the discovery frame may be a first MPDU containing the discovery information for the unassociated stations, and each of the one or more non-discovery-related frames may be a respective second MPDU containing non-discovery-related information intended for a corresponding one of the stations associated with the AP. The HE MU PPDU may be transmitted using DL OFDMA techniques, and the discovery information may be transmitted on the dedicated RU concurrently with the transmission of the one or more non-discovery-related frames on the one or more additional RUs.

The HE MU PPDU may include a preamble spanning the dedicated RU and each of the one or more additional RUs, for example, by duplicating the preamble for each 20 MHz channel segment of the frequency spectrum associated with the AP. In some implementations, the preamble may include a first duplicate transmitted on the dedicated RU, and may include one or more additional duplicates transmitted on the one or more additional RUs. The first duplicate may include a station association identification (STAID) value set to a selected value (such as AID=2045) indicating that the discovery information carried on the dedicated RU is intended for unassociated stations, and each duplicate of the one or more additional duplicates may include a STAID value identifying at least one station of the one or more associated stations to which non-discovery related information carried on a corresponding one of the additional RUs is intended. The STAID values may be embedded within any suitable portion of the preamble of the HE MU PPDU, or within in a field of a frame carrying the discovery information. In some implementations, the STAID values may be embedded within the HE-SIG-B field of the preamble of the HE MU PPDU.

At block 904, the process 900 proceeds with the STA transmitting, to the AP, a response based on the discovery information. The response may be any suitable response frame (such as probe response) that acknowledges receipt of the discovery information and provides identifying information of the receiving station to the AP. The identifying information, which may include the station's MAC address, supported data rates, capabilities, supported protocols, and other information, may be used by the AP to establish a wireless connection with the receiving station.

In some implementations, the discovery information may include one or more of a unique identifier of the AP, a TIM element, a TWT element, an OPS element, a MCS, an operating channel, an operating class, a BSS bandwidth, a transmit power limit, or a security parameter. In some other implementations, the discovery information may include one or more of a request for the unassociated stations to use OCT, an indication of whether the AP is part of a multiple BSSID set, an indication of whether the AP is a transmitted BSSID or a non-transmitted BSSID, an indication of whether the AP is a member of an ESS in which all member APs operating in the same portion of a 6 GHz frequency band have a co-located AP operating in a 2.4 GHz frequency band or a 5 GHz frequency band, or an indication of whether the AP is a member of an ESS in which all member APs operating in the same band periodically transmit unsolicited probe response frames.

In addition, or in the alternative, the discovery information may include a value, embedded in a signaling field of a preamble of the MU packet or in a field of a frame carrying the discovery information, indicating whether active scanning operations are permitted on a wireless channel associated with the AP. In some implementations, the discovery information may include one or more of instructions for the unassociated stations to maintain the transmit power below a value, to refrain from initiating active scanning operations on non-preferred scanning channels of the AP, or to refrain from initiating active scanning operations on a preferred scanning channel of the AP for a predetermined duration. In some aspects, the predetermined duration may be 20 TUs, although other suitable numbers of TUs may be used for the predetermined duration.

At block 906, the process 900 proceeds with the STA associating with the AP based on the received discovery information. Once the STA is associated with the AP, the STA may receive DL transmissions from the AP and may transmit UL data to the AP (such as in response to a trigger frame transmitted by the AP).

Figure 10:
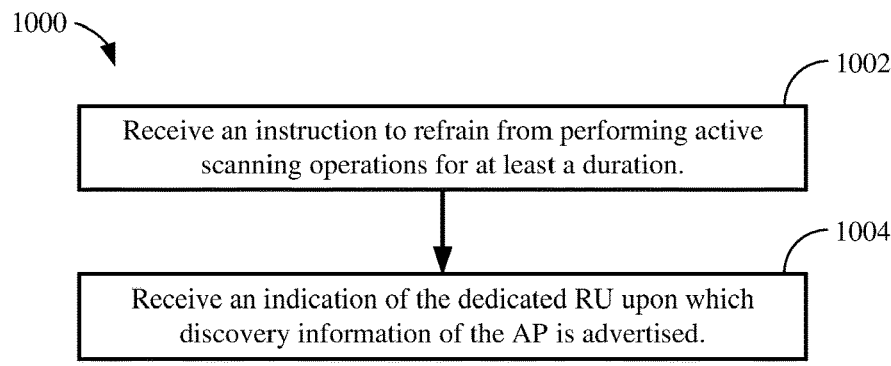
FIG. 10 shows an illustrative flow chart depicting another example process for wireless communication.

FIG. 10 shows an illustrative flow chart depicting another example process 1000 for wireless communication. In some implementations, the example process 1000 may be performed after the association operation in block 906 of FIG. 9. In other implementations, the example process 1000 may be performed concurrently with one of the processes described with respect to FIG. 9. The process 1000 may begin in block 1002 with the STA receiving an instruction to refrain from performing active scanning operations for at least a duration. The instruction may cause the unassociated stations to delay active scanning operations for a duration after detecting an idle channel so that the unassociated stations can discover the AP using passive scanning operations (rather than using active scanning operations). In some implementations, the duration may be 15 ms, although other suitable durations may be used.

At block 1004, the process 1000 proceeds with the STA receiving an indication of the dedicated RU upon which discovery information of the AP is advertised. The indication may be announced or transmitted to the STA in any suitable frame or message including, for example, beacon frames, discovery frames, probe response frames, capability elements, and so on. In some implementations, the indication may be embedded within the preambles of one or more HE MU PPDUs transmitted from the AP. In some aspects, the preamble of each HE MU PPDU transmitted from the AP may include the indication of the dedicated RU upon which the AP transmits its discovery information.

Figure 11A:
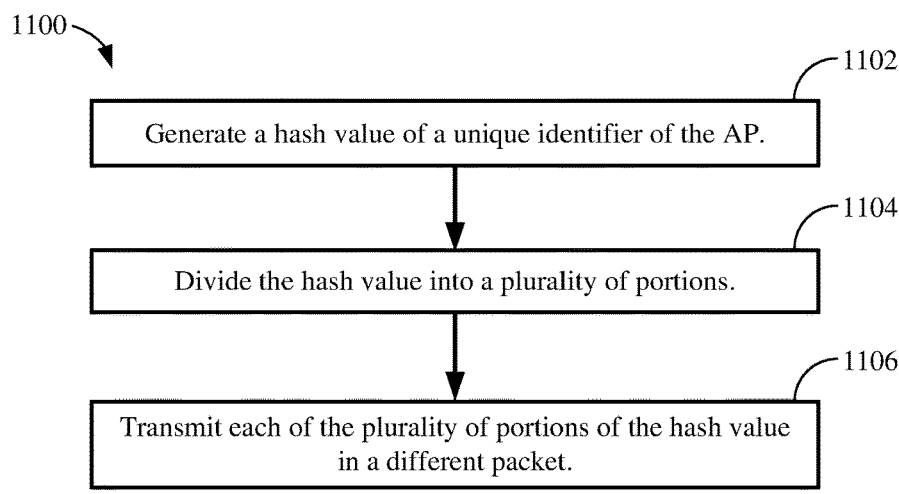
FIG. 11A shows an illustrative flow chart depicting an example process for broadcasting a hash value of a unique identifier of an AP.

FIG. 11A shows an illustrative flow chart depicting an example process 1100 for broadcasting a hash value of a unique identifier of the AP. The example process 1100 may be performed by an AP to advertise its discovery information to unassociated stations. In some implementations, the example process 1100 may be performed by the AP 110 of FIG. 1, the AP 300 of FIG. 3, or the AP of FIG. 5.

The AP may generate a hash value of a unique identifier of the AP (1102). In some implementations, the unique identifier may be at least one of the SSID of the AP, the MAC address of the AP, or other suitable identifying information of the AP. The AP may divide the hash value into a plurality of portions (1104), and may transmit each of the plurality of portions of the hash value in a preamble of a different packet (1106). In some implementations, the AP may divide the hash value into a plurality of portions, and may transmit each of the plurality of portions of the hash value in a corresponding one of a plurality of packets sequentially transmitted from the AP. As one example, in implementations for which the AP divides the hash value into 3 portions, the AP may transmit the first portion of the hash value in a first packet, may transmit the second portion of the hash value in a second packet, and may transmit the third portion of the hash value in a third packet. In this manner, a receiving device (such as an unassociated station) may extract the first portion of the hash value from a first packet received from the AP, may extract the second portion of the hash value from a second packet received from the AP, and may extract a third portion of the hash value from a third packet received from the AP. The receiving station may use the portions of the hash value extracted from the packets to determine the unique identifier of the AP, for example, to determine whether to associate with the AP.

In some implementations, each portion of the hash value may be embedded within the preamble of a corresponding HE MU PPDU containing DL data intended for one or more stations associated with the AP. The preamble may span an entire frequency spectrum of the AP, for example, by concurrently transmitting the preamble on a RU dedicated for advertising the AP's discovery information and on each of one or more additional RUs allocated for delivering DL data to the associated stations.

Figure 11B:
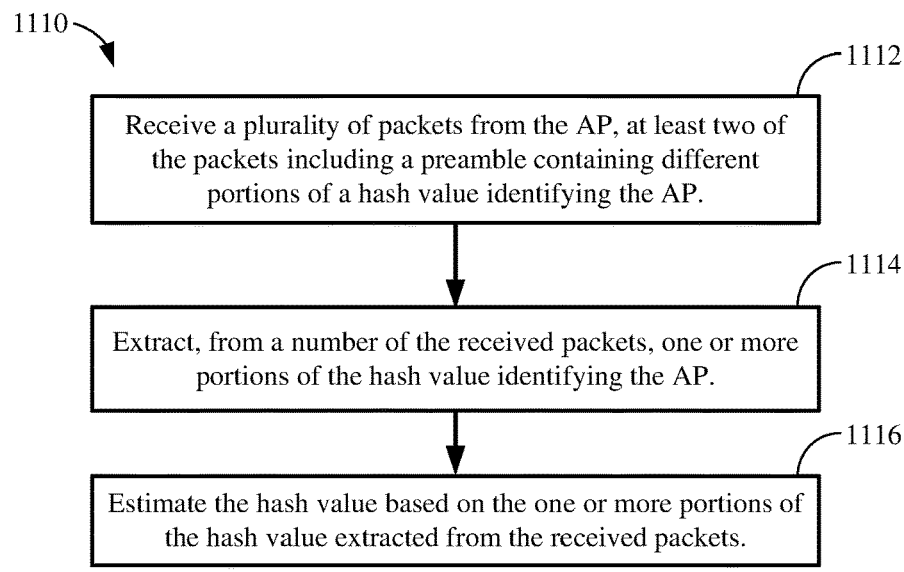
FIG. 11B shows an illustrative flow chart depicting an example process for determining discovery information of the AP.

FIG. 11B shows an illustrative flow chart depicting an example process 1110 for determining discovery information of an AP. The example process 1110 may be performed by a wireless station that is not associated with the AP. In some implementations, the example process 1110 may be performed by one of the stations STA1-STA4 of FIG. 1, the station 200 of FIG. 2, or the station STA4 of FIG. 5.

In some implementations, the process 1110 begins at block 1112 with STA receiving a plurality of packets from the AP, at least two of the packets including a preamble containing different portions of a hash value identifying the AP. The preamble may span an entire frequency spectrum of the AP, for example, by concurrently transmitting the preamble on a dedicated RU allocated for advertising the AP's discovery information and on each of one or more additional RUs allocated for DL transmissions to the associated stations. The hash value may be a hash function of the SSID of the AP, the MAC address of the AP, or other suitable identifying information of the AP. In some implementations, the packets may be HE MU PPDUs containing DL data intended for one or more stations associated with the AP, and the preamble of each of the HE MU PPDUs may include a portion of the hash value. The HE MU PPDUs may be transmitted using a DL OFDMA technique. In this manner, information identifying the AP may be embedded within HE MU PPDUs containing DL data for associated stations without embedding discovery frames in the HE MU PPDUs.

The process 1110 proceeds in block 1114 with the station may extracting, from a number of the received packets, one or more portions of the hash value identifying the AP, and continues in block 1116 with the station determining the hash value based on the one or more portions of the hash value extracted from the received packets. In some implementations, the station may combine the extracted portions of the hash value, using any suitable technique, to determine the hash value identifying the AP.

Figure 12A:
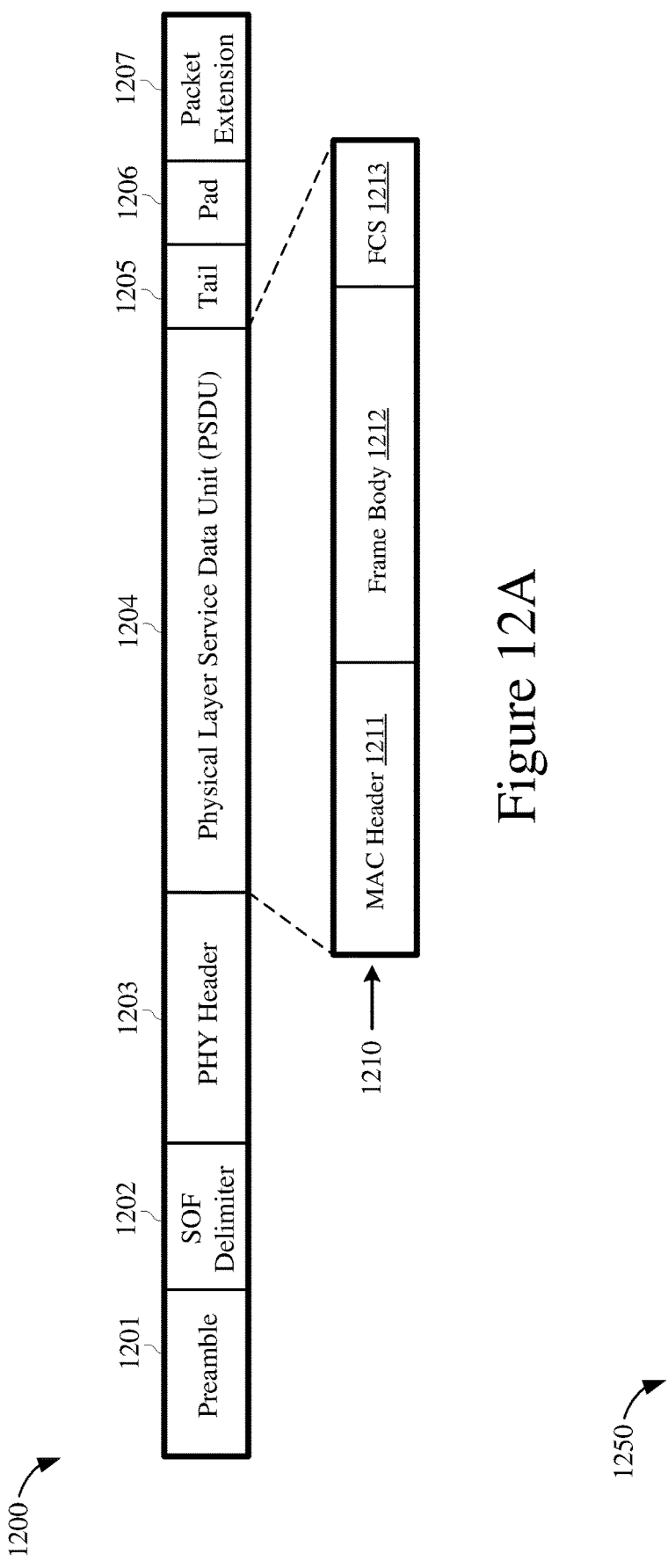
FIG. 12A shows an example high-efficiency (HE) multi-user (MU) physical-layer convergence protocol (PLCP) protocol data unit (PPDU) (referred to as a HE MU PPDU).

FIG. 12A shows an example packet 1200. The packet 1200, which may be a HE MU PPDU specified by the IEEE 802.11ax standards, may be used as the MU packets 510 and 520 of FIG. 5. The packet 1200 is shown to include a preamble 1201, a start of frame (SOF) delimiter 1202, a physical-layer (PHY) header 1203, a PSDU 1204, a tail field 1205, a pad field 1206, and a packet extension 1207.

Figure 12B:
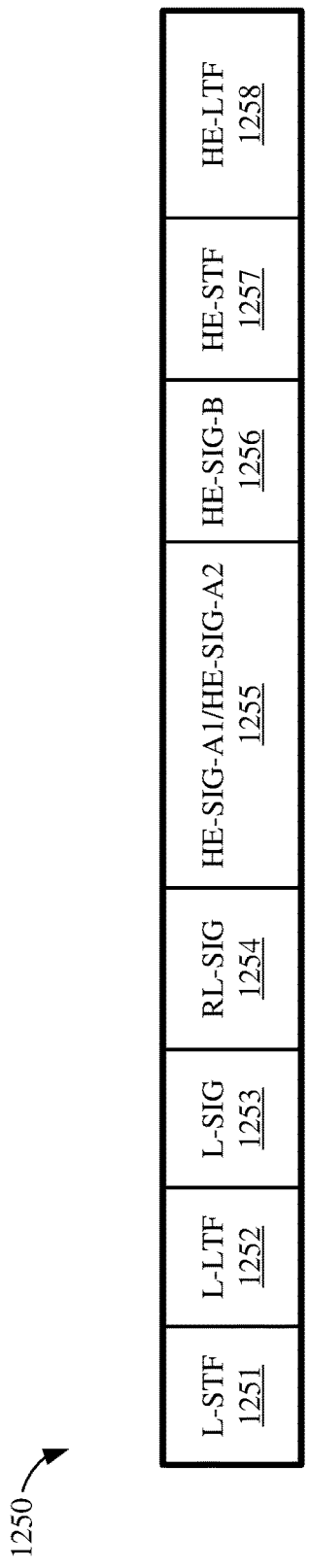
FIG. 12B shows an example high efficiency (HE) preamble.

The preamble 1201 may include synchronization information, timing information, frequency offset correction information, and signaling information, for example, as described with respect to FIG. 12B. The SOF delimiter 1202 may indicate the start of the data frame encapsulated within the packet 1200. The PHY header 1203 may include a number of fields for storing data rates, a reserved bit, a length of the PSDU 1204, a parity bit, a number of tail bits, and service information. The PSDU 1204 may contain an MPDU 1210. The tail field 1205 may include a number of tail bits, and the pad field 1206 may include a number of pad bits.

The MPDU 1210 and MAC frame within it may be compliant with the IEEE 802.11 family of standards. The MPDU 1210 includes a MAC header 1211, a frame body 1212, and a frame control sequence (FCS) field 1213. The MAC header 1211 may include a number of fields containing information that describes characteristics or attributes of data encapsulated within the frame body 1212, may include a number of fields indicating source and destination addresses of the data encapsulated within the frame body 1212, and may include a number of fields containing control information. In some implementations, the MAC header 1211 may be used as the MAC header of any suitable data frame, control frame, management frame, and action frame (such as the discovery frames used in the example operation 500 FIG. 5).

The frame body 1212 may include a number of PSDUs such as discovery frames, data frames, control frames, management frames, or any combination thereof. In some implementations, the frame body 1212 may include a discovery frame transmitted on a RU dedicated for advertising discovery information of the AP, and may include one or more data frames transmitted on one or more additional RUs allocated for delivering DL data to associated stations.

The packet extension 1207 does not typically store any data. Instead, the packet extension 1207 typically stores "dummy" data (such as repeating the last symbol of the packet payload), for example, to allow a receiving device more time to decode the packet 1200 without giving up medium access granted to a transmitting device. In accordance with the subject matter described in this disclosure, the packet extension 1207 may be used to store one or more HE-LTFs.

FIG. 12B shows an example HE preamble 1250. The HE preamble 1250 may be one implementation of the preamble 1201 of the packet 1200 of FIG. 12A. The preamble 1250, which in some aspects may be compliant with the IEEE 802.11ax standards, is shown to include a Legacy Short Training Field (L-STF) 1251, a Legacy Long Training Field (L-LTF) 1252, a Legacy Signal (L-SIG) field 1253, a Repeated Legacy Signal (RL-SIG) field 1254, a set of HE Signal-A (HE-SIG-A1/HE-SIG-A2) fields 1255, an HE Signal B (HE-SIG-B) field 1256, an HE Short Training Field (HE-STF) 1257, and an HE Long Training Field (HE-LTF) 1258.

The L-STF 1251 may include information for coarse frequency estimation, automatic gain control, and timing recovery. The L-LTF 1252 may include information for fine frequency estimation, channel estimation, and fine timing recovery. The L-SIG field 1253 may include modulation and coding information. The HE-SIG-A1 and HE-SIG-A2 fields 1255 may include parameters such as an indicated bandwidth, a payload guard interval (GI), a coding type, a number of spatial streams (Nsts), a space-time block coding (STBC), beamforming information, and so on. More specifically, the HE-SIG-A1 and HE-SIG-A2 fields 1255 may include a set of fields to store parameters describing the type of information stored in the HE-LTF 1258. For example, the set of fields includes (1) a CP+LTF Size field that stores a cyclic prefix (CP) value and a length of the HE-LTF 1258; (2) an Nsts field to store information indicating the number spatial streams, (3) a STBC field store a value for space-time block coding, and (4) a transmit beamforming (TxBF) field to store information pertaining to beamforming.

The HE-SIG-B field 1256 may include one or two HE-SIG-B content channels, with each HE-SIG-B content channel conveying user allocation for one or more 20 MHz subchannels. A 20 MHz HE MU PPDU may include one HE-SIG-B content channel, while an HE MU PPDU with greater than 20 MHz PPDU bandwidth may include two HE-SIG-B content channels. In each HE-SIG-B content channel, the number of spatial streams for a user in an RU may be indicated by the Nsts field in the User field (if there is only one User field).

In some implementations, the HE-SIG-B field 1256 may include a value identifying the dedicated RU upon which discovery information of the AP is transmitted. The value may be an AID value that does not correspond to AID values assigned to associated stations. In some aspects, the value may be AID=2045, which is the AID value used in trigger frames to allocate random-access RUs to unassociated stations.

Information contained in the HE-STF 1257 may be used to improve automatic gain control estimates for SU-MIMO and MU-MIMO communications, and information contained in the HE-LTF 1258 may be used to estimate various MIMO channel conditions.

Mappings between AID values and dedicated RU sizes and locations may be stored in the AP, for example, as described with respect to FIG. 5. The AP may share the mappings between AID values and dedicated RU sizes and locations with any unassociated stations that can receive and decode the preamble of the HE MU PPDU 1200.

Figure 13A:
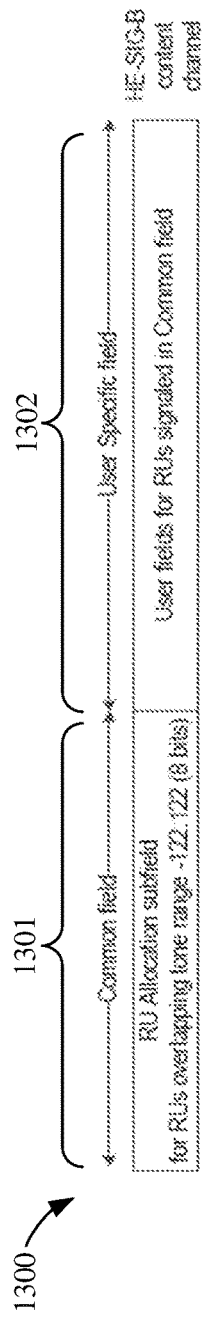
FIGS. 13A-13C show example HE-SIG-B fields of a HE preamble.

FIG. 13A shows example HE-SIG-B field 1300 of a HE preamble. The HE-SIG-B field 1300, which may be used for 20 MHz HE MU PPDU transmissions, includes a common field 1301 and a user specific field 1302. Together, the common field 1301 and a user specific field 1302 may form a HE-SIG-B content for the corresponding 20 MHz channel. The user field 1301 may store RU allocations for overlapping tones, and the user specific field 1302 may store RU signaling information.

Figure 13B:
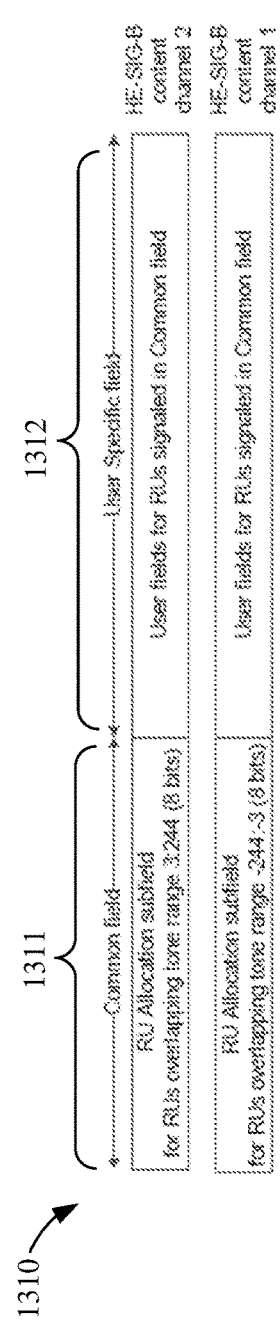

FIG. 13B shows example HE-SIG-B field 1310 of a HE preamble. The HE-SIG-B field 1310, which may be used for 40 MHz HE MU PPDU transmissions, includes a common field 1311 and a user specific field 1312 for each of the two content channels that form the 40 MHz transmission bandwidth. The user field 1311 may store RU allocations for overlapping tones, and the user specific field 1312 may store RU signaling information.

Figure 13C:
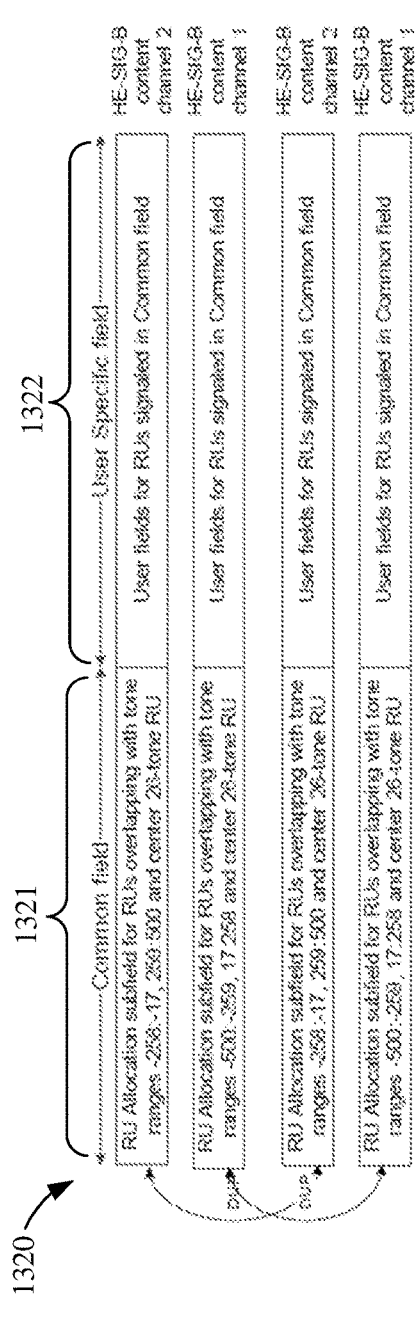

FIG. 13C shows example HE-SIG-B field 1320 of a HE preamble. The HE-SIG-B field 1320, which may be used for 80 MHz HE MU PPDU transmissions, includes a common field 1321 and a user specific field 1322 for a first two 20 MHz content channels of the 80 MHz transmission bandwidth; the second two 20 MHz content channels of the 80 MHz transmission bandwidth may be duplicates of the first two content channels.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices such as, for example, a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also can be implemented as one or more computer programs, i.e., one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

What is claimed is:

1. A method performed by an access point (AP) operating in at least a 6 gigahertz (GHz) frequency band, comprising:
    allocating at least one resource unit (RU) in the 6 GHz frequency band for transmission of discovery information in accordance with whether the AP periodically transmits unsolicited probe response frames;
    allocating one or more RUs in the 6 GHz frequency band for transmission of downlink data;
    transmitting a multi-user (MU) packet that includes the discovery information and the downlink data, wherein transmitting the MU packet comprises:
        transmitting, via the at least one RU in the 6 GHz frequency band and within a discovery interval that is shorter than a beacon interval, a fast initial link setup (FILS) discovery frame or an unsolicited probe response frame that includes the discovery information; and
        transmitting, via the one or more RUs in the 6 GHz frequency band, one or more frames that include the downlink data;
    receiving, from at least one station that is unassociated with the AP, a response to the discovery information in the MU packet; and
    performing an association operation with the at least one station in accordance with the response.

2. The method of claim 1, wherein each of the one or more frames is one of a data frame, a control frame, or a management frame.

3. The method of claim 1, wherein the at least one RU allocated for transmission of the discovery information is located on a preferred scanning channel (PSC) of the AP.

4. The method of claim 1, wherein:
    the MU packet comprises a high-efficiency (HE) MU physical-layer protocol data unit (PPDU); and
    the FILS discovery frame comprises a first medium access control (MAC) protocol data unit (MPDU); and each of the one or more frames comprises a respective second MPDU.

5. The method of claim 1, wherein the MU packet includes a preamble comprising:
   a first duplicate transmitted on the at least one RU, the first duplicate comprising a station association identification (STAID) value identifying unassociated stations; and
   one or more additional duplicates transmitted on the one or more RUs, each of the one or more additional duplicates comprising a STAID value identifying associated stations.

6. The method of claim 1, wherein the discovery information includes one or more of a unique identifier of the AP, a traffic indication map (TIM) element, a target wait time (TWT) element, an opportunistic power save (OPS) element, a modulation and coding scheme (MCS), an operating channel, an operating class, a basic service set (BSS) bandwidth, a transmit power limit, or a security parameter.

7. The method of claim 1, wherein the discovery information includes a value, embedded in a signaling field of a preamble of the MU packet or in a field of the FILS discovery frame or the unsolicited probe response frame carrying the discovery information, indicating whether active scanning operations are permitted on a wireless channel associated with the AP.

8. The method of claim 1, wherein the discovery information includes one or more of a request for unassociated stations to use on-channel tunneling (OCT), an indication of whether the AP is part of a multiple basic service set identifier (BSSID) set, an indication of whether the AP is a transmitted BSSID or a non-transmitted BSSID, an indication of whether the AP is a member of an extended basic service set (ESS) in which all member APs operating in a same portion of the 6 GHz frequency band have a co-located AP operating in a 2.4 GHz frequency band or a 5 GHz frequency band, or an indication of whether the AP is a member of an ESS in which all member APs operating in a same frequency band periodically transmit unsolicited probe response frames.

9. The method of claim 1, wherein the discovery information includes one or more instructions for unassociated stations to maintain a transmit power below a value, to refrain from initiating active scanning operations on non-preferred scanning channels of the AP, or to refrain from initiating active scanning operations on a preferred scanning channel of the AP for a duration.

10. A method performed by a station not associated with an access point (AP), comprising:
   receiving, from the AP and in accordance with whether the AP, operating in at least a 6 gigahertz (GHz) frequency band, periodically transmits unsolicited probe response frames, a multi-user (MU) packet that includes discovery information and downlink data, wherein receiving the MU packet comprises:
      receiving, via at least one RU in the 6 GHz frequency band and within a discovery interval that is shorter than a beacon interval, a fast initial link setup (FILS) discovery frame or an unsolicited probe response frame that includes the discovery information; and
      receiving, via one or more RUs in the 6 GHz frequency band, one or more frames that include the downlink data;
   transmitting, to the AP, a response to the discovery information in the MU packet; and
   associating with the AP in accordance with the response.

11. The method of claim 10, wherein each of the one or more frames is one of a data frame, a control frame, or a management frame.

12. The method of claim 10, wherein the at least one RU used for reception of the discovery information is located on a preferred scanning channel (PSC) of the AP.

13. The method of claim 10, wherein:
   the MU packet comprises a high-efficiency (HE) MU physical-layer protocol data unit (PPDU);
   the FILS discovery frame comprises a first medium access control (MAC) protocol data unit (MPDU); and
   each of the one or more frames comprises a respective second MPDU.

14. The method of claim 10, wherein the MU packet includes a preamble comprising:
   a first duplicate transmitted on the at least one RU, the first duplicate comprising a station association identification (STAID) value identifying unassociated stations; and
   one or more additional duplicates transmitted on the one or more RUs, each of the one or more additional duplicates comprising a STAID value identifying associated stations.

15. The method of claim 10, wherein the discovery information includes one or more of a unique identifier of the AP, a traffic indication map (TIM) element, a target wait time (TWT) element, an opportunistic power save (OPS) element, a modulation and coding scheme (MCS), an operating channel, an operating class, a basic service set (BSS) bandwidth, a transmit power limit, or a security parameter.

16. The method of claim 10, wherein the discovery information includes a value, embedded in a signaling field of a preamble of the MU packet or in a field of the FILS discovery frame or the unsolicited probe response frame carrying the discovery information, indicating whether active scanning operations are permitted on a wireless channel associated with the AP.

17. The method of claim 10, wherein the discovery information includes one or more of a request for unassociated stations to use on-channel tunneling (OCT), an indication of whether the AP is part of a multiple basic service set identifier (BSSID) set, an indication of whether the AP is a transmitted BSSID or a non-transmitted BSSID, an indication of whether the AP is a member of an extended basic service set (ESS) in which all member APs operating in a same portion of the 6 GHz frequency band have a co-located AP operating in a 2.4 GHz frequency band or a 5 GHz frequency band, or an indication of whether the AP is a member of an ESS in which all member APs operating in a same frequency band periodically transmit unsolicited probe response frames.

18. The method of claim 10, wherein the discovery information includes one or more of instructions for unassociated stations to maintain a transmit power below a value, to refrain from initiating active scanning operations on non-preferred scanning channels of the AP, or to refrain from initiating active scanning operations on a preferred scanning channel of the AP for a duration.

19. An access point (AP) operating in at least a 6 gigahertz (GHz) frequency band, comprising:
   at least one modem;
   at least one processor communicatively coupled with the at least one modem; and
   at least one memory communicatively coupled with the at least one processor and storing processor-readable code that, when executed by the at least one processor in conjunction with the at least one modem, is configured to perform operations comprising:

allocating at least one resource unit (RU) in the 6 GHz frequency band for transmission of discovery information in accordance with whether the AP periodically transmits unsolicited probe response frames;
allocating one or more RUs in the 6 GHz frequency band for transmission of downlink data;
transmitting a multi-user (MU) packet that includes the discovery information and the downlink data, wherein transmitting the MU packet comprises:
  transmitting, via the at least one RU in the 6 GHz frequency band and within a discovery interval that is shorter than a beacon interval, a fast initial link setup (FILS) discovery frame or an unsolicited probe response frame that includes the discovery information; and
  transmitting, via the one or more RUs in the 6 GHz frequency band, one or more frames that include the downlink data;
receiving, from at least one station that is unassociated with the AP, a response to the discovery information in the MU packet; and
performing an association operation with the at least one station in accordance with the response.

20. The AP of claim 19, wherein the at least one RU allocated for transmission of the discovery information is located on a preferred scanning channel (PSC) of the AP.

21. The AP of claim 19, wherein the MU packet includes a preamble comprising:
  a first duplicate transmitted on the at least one RU, the first duplicate comprising a station association identification (STAID) value identifying unassociated stations; and
  one or more additional duplicates transmitted on the one or more RUs, each of the one or more additional duplicates comprising a STAID value identifying an associated station.

22. The AP of claim 19, wherein the discovery information includes a value, embedded in a signaling field of a preamble of the MU packet or in a field of the FILS discovery frame or the unsolicited probe response frame carrying the discovery information, indicating whether active scanning operations are permitted on a wireless channel associated with the AP.

23. The AP of claim 19, wherein the discovery information includes one or more instructions for unassociated stations to maintain a transmit power below a value, to refrain from initiating active scanning operations on non-preferred scanning channels of the AP, or to refrain from initiating active scanning operations on a preferred scanning channel of the AP for a duration.

24. A wireless communication device, comprising:
  at least one modem;
  at least one processor communicatively coupled with the at least one modem; and
  at least one memory communicatively coupled with the at least one processor and storing processor-readable code that, when executed by the at least one processor in conjunction with the at least one modem, is configured to perform operations comprising:
    receiving, from an access point (AP) and in accordance with whether the AP, operating in at least a 6 gigahertz (GHz) frequency band, periodically transmits unsolicited probe response frames, a multi-user (MU) packet that includes discovery information and downlink data, wherein receiving the MU packet comprises:
      receiving, via at least one RU in the 6 GHz frequency band and within a discovery interval that is shorter than a beacon interval, a fast initial link setup (FILS) discovery frame or an unsolicited probe response frame that includes the discovery information; and
      receiving, via one or more RUs in the 6 GHz frequency band, one or more frames that include the downlink data;
    transmitting, to the AP, a response to the discovery information in the MU packet; and
    associating with the AP in accordance with the response.

25. The wireless communication device of claim 24, wherein the at least one RU used for reception of the discovery information is located on a preferred scanning channel (PSC) of the AP.

26. The wireless communication device of claim 24, wherein the MU packet includes a preamble comprising:
  a first duplicate transmitted on the at least one RU, the first duplicate comprising a station association identification (STAID) value identifying unassociated stations; and
  one or more additional duplicates transmitted on the one or more RUs, each of the one or more additional duplicates comprising a STAID value identifying an associated station.

27. The wireless communication device of claim 24, wherein the discovery information includes a value, embedded in a signaling field of a preamble of the MU packet or in a field of the FILS discovery frame or the unsolicited probe response frame carrying the discovery information, indicating whether active scanning operations are permitted on a wireless channel associated with the AP.

28. The wireless communication device of claim 24, wherein the discovery information includes one or more of a request for unassociated stations to use on-channel tunneling (OCT), an indication of whether the AP is part of a multiple basic service set identifier (BSSID) set, an indication of whether the AP is a transmitted BSSID or a non-transmitted BSSID, an indication of whether the AP is a member of an extended basic service set (ESS) in which all member APs operating in a same portion of the 6 GHz frequency band have a co-located AP operating in a 2.4 GHz frequency band or a 5 GHz frequency band, or an indication of whether the AP is a member of an ESS in which all member APs operating in a same frequency band periodically transmit unsolicited probe response frames.

29. The method of claim 1, wherein transmitting the MU packet comprises:
  transmitting the FILS discovery frame or the unsolicited probe response frame multiple times during the beacon interval.

30. The method of claim 1, wherein transmitting the MU packet comprises:
  transmitting the FILS discovery frame or the unsolicited probe response frame every 15 Time Units (TUs).

31. The AP of claim 19, wherein transmitting the MU packet comprises:
  transmitting the FILS discovery frame or the unsolicited probe response frame multiple times during the beacon interval.

32. The AP of claim 19, wherein transmitting the MU packet comprises:
  transmitting the FILS discovery frame or the unsolicited probe response frame every 15 Time Units (TUs).

33. The method of claim 1, wherein the AP is a member of an extended service set (ESS) in which member APs operating in the 6 GHz frequency band periodically transmit unsolicited probe response frames.

* * * * *